(12) United States Patent
Weber

(10) Patent No.: US 11,161,700 B2
(45) Date of Patent: Nov. 2, 2021

(54) METHOD FOR OPERATING A TRANSPORT APPARATUS IN THE FORM OF A LONG STATOR LINEAR MOTOR

(71) Applicant: B&R INDUSTRIAL AUTOMATION GMBH, Eggelsberg (AT)

(72) Inventor: Andreas Weber, Salzburg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 16/022,038

(22) Filed: Jun. 28, 2018

(65) Prior Publication Data
US 2019/0002214 A1    Jan. 3, 2019

(30) Foreign Application Priority Data
Jun. 29, 2017   (AT) .............................. A 50537/2017

(51) Int. Cl.
| | |
|---|---|
| *B65G 54/02* | (2006.01) |
| *B60L 13/03* | (2006.01) |
| *H02K 21/02* | (2006.01) |
| *H02P 6/00* | (2016.01) |
| *H02K 41/03* | (2006.01) |
| *H02P 25/06* | (2016.01) |
| *B65G 43/00* | (2006.01) |

(52) U.S. Cl.
CPC .............. *B65G 54/02* (2013.01); *B60L 13/03* (2013.01); *B65G 43/00* (2013.01); *H02K 21/025* (2013.01); *H02K 41/03* (2013.01); *H02P 6/006* (2013.01); *H02P 25/06* (2013.01)

(58) Field of Classification Search
CPC ........ B65G 54/02; B60L 13/03; H02K 21/025
See application file for complete search history.

(56) References Cited

U.S. PATENT DOCUMENTS

| | | | | |
|---|---|---|---|---|
| 3,602,786 A | * | 8/1971 | Izhelya | ................ H02K 41/025 318/135 |
| 3,697,838 A | * | 10/1972 | New | ....................... E05F 15/60 318/135 |

(Continued)

FOREIGN PATENT DOCUMENTS

| | | |
|---|---|---|
| DE | 102016112618 | 1/2007 |
| DE | 102012224179 | 6/2014 |

(Continued)

OTHER PUBLICATIONS

Notice of Allowability issued in counterpart U.S. Appl. No. 16/834,509 (dated Jul. 15, 2021).

*Primary Examiner* — William R Harp
(74) *Attorney, Agent, or Firm* — Greenblum & Bernstein, P.L.C.

(57) ABSTRACT

In order to allow for more flexible process control of a transport apparatus in the form of a long stator linear motor, in particular in order to at least intermittently increase the maximum achievable speed of a transport unit without changing the energy-related basic conditions (maximum current or maximum voltage) of the transport apparatus, according to the invention, in order to change a magnetic flux in the magnetic circuit during movement of the transport unit along the transport route, a magnetic reluctance of the magnetic circuit is changed and/or a magnetomotive force of the magnetic circuit is changed on the transport unit.

19 Claims, 11 Drawing Sheets

(56) References Cited

U.S. PATENT DOCUMENTS

| | | | |
|---|---|---|---|
| 4,890,023 A * | 12/1989 | Hinds | H02K 41/025 |
| | | | 310/12.15 |
| 6,876,107 B2 | 4/2005 | Jacobs | |
| 8,511,235 B2 * | 8/2013 | Fukukawa | B60L 13/03 |
| | | | 104/292 |
| 9,729,039 B2 * | 8/2017 | Hon | H02K 21/025 |
| 10,246,266 B2 * | 4/2019 | Weber | B60L 13/03 |
| 10,594,245 B2 | 3/2020 | Plainer | |
| 10,974,909 B2 | 4/2021 | Davidson | |
| 2007/0001519 A1 | 1/2007 | Jeong | |
| 2008/0115372 A1 | 1/2008 | Vogel | |
| 2011/0100252 A1 * | 5/2011 | Fukukawa | B60L 13/03 |
| | | | 104/293 |
| 2013/0074724 A1 | 3/2013 | King | |
| 2015/0008768 A1 | 1/2015 | Achterberg | |
| 2015/0083018 A1 * | 3/2015 | Clark | B60L 13/10 |
| | | | 104/282 |
| 2015/0282692 A1 | 10/2015 | Wieters | |
| 2015/0303841 A1 | 10/2015 | Suzuki | |
| 2016/0380562 A1 | 12/2016 | Weber | |
| 2017/0310191 A1 | 10/2017 | Mezger | |
| 2018/0145575 A1 | 5/2018 | Woehl-Bruhn | |
| 2019/0389675 A1 * | 12/2019 | Kleinikkink | H02K 11/0141 |

FOREIGN PATENT DOCUMENTS

| | | |
|---|---|---|
| DE | 102014118335 | 6/2015 |
| EP | 1 739 812 | 1/2007 |
| EP | 3109998 | 12/2016 |
| EP | 3236564 | 10/2017 |
| JP | 03-169253 | 7/1991 |
| WO | 2004/103792 | 12/2004 |
| WO | 2013/143783 | 10/2013 |

* cited by examiner

METHOD FOR OPERATING A TRANSPORT APPARATUS IN THE FORM OF A LONG STATOR LINEAR MOTOR

CROSS-REFERENCE TO RELATED APPLICATIONS

The present application claims priority under 35 U.S.C. § 119(a) of Austria Patent Application No. A 50537/2017 filed Jun. 29, 2017, the disclosure of which is expressly incorporated by reference herein in its entirety.

BACKGROUND OF THE INVENTION

1. Field of the Invention

The present invention relates to a method for operating a transport apparatus in the form of a long stator linear motor, in which a transport unit is moved along a transport route of the long stator linear motor, drive magnets of the transport unit interacting with drive coils of the long stator linear motor in order to generate a propulsive force, the drive magnets of the transport unit and the drive coils of the transport route of the long stator linear motor being sources of magnetomotive force for a developing magnetic circuit. The present invention further relates to a transport apparatus in the form of a long stator linear motor comprising at least one transport unit and at least one transport route, and to a use of the method according to the invention and of the transport apparatus according to the invention.

2. Discussion of Background Information

In virtually all modern production facilities, it is necessary to move structural elements or components between individual handling or production stations, also over long transport routes, by means of transport apparatuses. A plurality of transport or conveying apparatuses are known for this purpose. Continuous conveyors in various embodiments are often used for this purpose. The various embodiments of belt conveyors are conventional continuous conveyors, in the case of which belt conveyors a rotational movement of an electric drive is converted into a linear movement of the belt conveyor. Conventional continuous conveyors of this kind significantly restrict flexibility; in particular, it is not possible to individually transport separate transport units. In order to remedy this and in order to meet the requirements of modern, flexible transport apparatuses, what are known as long stator linear motors (LLM) are being used increasingly to replace conventional continuous conveyors.

In a long stator linear motor, a plurality of electric drive coils that form the stator are arranged side-by-side, in a stationary manner, along a transport route. A plurality of drive magnets, either in the form of permanent magnets or in the form of an electric coil or shading coil, are arranged on a transport unit, which magnets interact with the drive coils. The interaction between the (electro)magnetic fields of the drive magnets and of the drive coils generates a propulsive force on the transport unit, which force moves the transport unit forwards. The long stator linear motor can be designed as a synchronous machine, both self-excited and separately excited, or as an asynchronous machine. The magnitude of the propulsive force is influenced, and the transport unit can be moved in a desired manner along the transport route, by means of actuating the individual drive coils in order to regulate the magnetic flux. In this case, it is also possible to arrange a plurality of transport units along the transport route, the movements of which units can be controlled individually and mutually independently by means of the drive coils, which interact with one transport unit in each case, being energized, usually by applying an electrical voltage. A long stator linear motor is characterized in particular by better and more flexible utilization of the movement (position, speed, acceleration) over the entire working region, individual regulation/control of the transport units along the transport route, improved energy utilization, a reduction in maintenance costs due to the smaller number of wearing parts, simple replacement of the transport units, efficient monitoring and error detection, and optimization of the product stream along the transport route. Examples of long stator linear motors of this kind can be found in WO 2013/143783 A1, U.S. Pat. No. 6,876,107 B2, US 2013/0074724 A1 or WO 2004/103792 A1.

A long stator linear motor places high requirements on the control of the movement of the transport units. For this purpose, a plurality of controllers is usually arranged along the transport route, which controllers control the stator currents of the drive coils in order to move the transport units along the transport route as intended. The movement of the transport units requires each drive coil to be controlled separately, in order to ensure a fluid, controlled and stable movement of the transport units along the transport route. A current position of the transport unit can be detected and provided to the controllers by means of suitable sensors which may also be arranged along the transport route. However, a plurality of transport units moves on the transport route, and therefore different transport units are moved by different drive coils. However, the properties of the transport units moved along the transport route may differ. For example, transport units may be loaded differently, have different states of wear, cause different guide forces on account of production-related imperfections, cause different frictional forces, etc. It is likewise conceivable for transport units of different designs or different sizes to be moved along the transport route. All these factors influence the control of the movement of the transport units however.

In this case, the interaction between the drive magnets of the transport unit and the drive coils of the transport route, which magnets and coils are mutually spaced by means of a gap or what is known as an air gap, is particularly important in the case of a long stator linear motor. The drive magnets of the transport unit and the drive coils of the transport route are sources of magnetomotive force and form a common magnetic circuit. In addition to the magnetomotive force, the magnetic circuit is in addition determined by a magnetic reluctance that is primarily determined by the air gap and in particular by the size of the gap and by the magnetic permeability of the air in the gap. The magnitude of the magnetomotive force generated by the sources of magnetomotive force, and the magnitude of the magnetic reluctance of the magnetic circuit directly determine the electromagnetic properties of the long stator linear motor, in particular the magnetic flux of the magnetic circuit. In this case, even small changes in the magnetic variables, for example a change in the magnetic reluctance due to a change in the size of the air gap on account of wear or incorrect guidance of a transport unit, can have an impact. The size of the air gap is generally fixed by the design of a long stator linear motor, for example by the structural design of the long stator linear motor, and is preferably not changed during operation. The magnetic permeability of the air in the air gap is a constant physical variable. The magnetomotive force of the drive magnets is generally fixed, since said magnets are usually formed as permanent magnets and are invariable during the operation of the transport apparatus. The magnetomotive force of the drive coils is defined by the electrical voltage applied to the drive coils, the magnitude of which voltage is usually determined by the control unit of the transport apparatus.

DE 10 2014 118 335 A1 describes a linear drive unit of a machine tool comprising a mechanism for changing the magnetic gap in order to change the order of magnitude of a magnetic gap between a magnet and a coil so as to adapt the balance between the thrust and cogging of the linear drive unit. In this case, the air gap is enlarged in a highly precise machining process in order to reduce the flux density and thus simultaneously also reduce the cogging. The air gap is reduced in a machining process that requires low precision but a high load. This increases the flux density and therefore the propulsive force, but also the cogging. In DE 10 2014 118 335 A1, the adjustment of the air gap is thus used to reduce the cogging for the purpose of extremely precise positioning of the moving part of the linear drive unit. The other method, using a reduced air gap, is selected for less precise machining. The modes are selected by the operator of the machine tool, and the mode is not changed during operation. This is expedient for a linear drive unit of a machine tool, but less so for a transport system comprising a long stator linear motor. In the case of a long stator linear motor, the possible cogging is therefore often reduced by structural measures, for example in the design of the laminated core of the stator.

In contrast, for transport applications, it is often desirable to be able to regulate the speed of the transport units in a flexible manner and over a wide range. In transport applications, there are often route portions on which a transport unit is to move at a higher speed, for example in a return region for empty transport units in a closed transport route. Neither accuracy, nor influences such as cogging, are important here. In other route portions, it is often necessary to maintain a precise speed, or a high propulsive force is required in order to move large loads. The drive coils of the long stator linear motor are energized individually by power electronics units, by means of the power electronics units applying the coil voltages, specified by the control, to the drive coils. The power electronics units are of course designed for a maximum current or a maximum voltage, and therefore, in the case of a given structural design of the long stator linear motor, the achievable propulsive force and achievable speed of a transport unit is also specified. Therefore, in order to achieve a large speed range, the power electronics units, but also the drive coils, need to be correspondingly powerful. When a long stator linear motor has a large number of drive coils and power electronics units, this is of course associated with high complexity and costs, and is therefore generally undesirable.

In the case of rotary electric motors, "field-weakening" operation is known, in order to increase the rotational speed of the electric motor. In this case, the drive coils of the electric motor are substantially energized such that an opposing electromagnetic field results, which field weakens the field of the drive magnets of the electric motor. This opposing field of course has to be synchronous with the armature of the electromagnet, which places high requirements on the control. Irrespective thereof, the electrical energy required to maintain said opposing field is a pure loss, which is disadvantageous for thermal reasons, simply due to the power loss. In addition, the power electronics must have corresponding reserve capacities in order to be able to provide the electrical power required for the opposing field. However, this is directly reflected in greater complexity and thus also higher costs for the power electronics. It would also be possible to operate the long stator linear motor in a field-weakening operating mode, but this would be even more disadvantageous in this case, as there are many more drive coils than in a rotary electric motor.

SUMMARY OF THE EMBODIMENTS

Embodiments of the invention allow for more flexible process control of a transport apparatus in the form of a long stator linear motor, without changing the energy-related basic conditions (maximum current or maximum voltage of the power electronics units) of the transport apparatus.

According to embodiments, in order to change a magnetic flux in the magnetic circuit during movement of the transport unit along the transport mute, a magnetic reluctance of the magnetic circuit is changed and/or a magnetomotive force of the magnetic circuit is changed on the transport unit. This makes it possible to deliberately influence the movement variables of the transport unit (e.g. propulsive force, speed) during movement along the transport mute. The fact that the control of the drive currents of the individual drive coils of a long stator linear motor in order to move a transport unit is in any case already very complex creates a good possibility for influencing the movement variables of the transport unit without interfering with the control of the drive coils, in particular in the controller used. It is therefore the controlled system of the long stator linear motor that is changed, and not the control or the controller respectively. As a result, for example limits of movement variables of the transport unit can be changed, electrical (ohmic) losses can be reduced, or force ratios on the transport unit can be influenced without field-weakening regulation of the drive coils on the stator side.

In order to change the magnetic reluctance of the magnetic circuit, the position of at least one drive magnet of the transport unit is advantageously changed, in at least one degree of freedom of movement, by means of at least one first actuator that is arranged on the transport unit and interacts with the at least one drive magnet of the transport unit. The magnetic reluctance can be deliberately influenced, in order to change the magnetic flux of the magnetic circuit, by changing the position of at least one drive magnet. In this case, the at least one degree of freedom of movement may be translational or rotational.

In order to change the magnetic reluctance of the magnetic circuit, the position of at least one drive coil of the transport route is preferably changed, in at least one degree of freedom of movement, by means of at least one second actuator that is arranged on the transport route and interacts with the at least one drive coil of the transport route. As a result, the magnetic reluctance of the magnetic circuit can be changed on the stator side during movement of the transport unit.

It is advantageous if, in order to change the magnetic reluctance of the magnetic circuit, at least one magnetic reluctance element having a specified magnetic permeability is inserted, by means of at least one third actuator arranged on the transport unit or on the transport route, into an air gap between at least one drive magnet of the transport unit and at least one drive coil of the transport route that interacts therewith. This provides a further possibility for deliberately influencing the magnetic reluctance, and therefore the magnetic flux, in the magnetic circuit during movement of the transport unit.

According to a further advantageous embodiment of the invention, in order to change the magnetic reluctance of the magnetic circuit, at least one magnetic reluctance element having a specified magnetic permeability is introduced into an opening, arranged on the transport route, by means of at least one fourth actuator arranged on the transport route. As a result, the magnetic reluctance, and thus the magnetic flux, can be changed on the stator side without it being necessary to interfere with the air gap.

In order to change the magnetomotive force of the drive magnets of the transport unit, at least one additional coil is advantageously arranged on the transport unit, an electrical boost voltage being applied to the additional coil, at least intermittently, in order to at least intermittently increase or reduce the magnetomotive force on the transport unit, so as to thus generate a magnetomotive boost force that is oriented in the same direction as or counter to the magnetomotive force of the drive magnets, as a result of which the magnetic flux is increased or reduced. This provides a possibility for changing the magnetic flux of the magnetic circuit without it being necessary to change the positions of individual components of the transport apparatus (e.g. drive magnet, drive coil).

If an actual magnetic flux is determined in the magnetic circuit, and a control unit controls the actual magnetic flux to a defined target magnetic flux, by means of the magnetic reluctance and/or the magnetomotive force on the transport unit being changed by the control unit, a possibility is provided for compensating for guidance inaccuracies of the transport route, by means of the magnetic flux in the air gap being controlled to a constant value.

It is advantageous if, on at least one side of the transport unit, the magnetic reluctance and/or the magnetomotive force on the transport unit is changed on the relevant side of the transport unit, in order to generate a lateral force that acts on the transport unit. As a result, the magnetic flux of one side is changed relative to the other side of the transport unit, which makes it possible to steer the transport route in a desired direction at a transfer position of the transport route, since the difference between the magnetic fluxes of the two sides of the transport unit results in different lateral magnetic forces on either side when the coil voltages remain the same. The transport unit is thus diverted to the side having the higher lateral force, which results from the larger magnetic flux.

Preferably, the magnetic flux of the magnetic circuit is reduced by changing the magnetic reluctance and/or the magnetomotive force on the transport unit. It is thus possible to increase the maximum achievable speed of the transport unit without changing the electrical basic conditions in the process. At a given coil voltage or a given coil current, a specific propulsive force can be generated that moves the transport unit forwards. However, as a result of the movement of the transport unit, the magnetic field of the drive magnet of the moving transport unit induces a voltage in the drive coils, in a known manner, which voltage is also referred to as a counter EMF (counter electromotive force) and counteracts the coil voltage applied. The EMF voltage limits the maximum achievable speed of the transport unit, since the induced voltage counteracts the coil voltage and the possible current consumption of the drive coils is thus limited. The maximum achievable speed of the transport unit can be increased by reducing the magnetic flux while maintaining the coil voltage, since the reduced magnetic flux makes it possible to reduce the induced EMF voltages.

Embodiments of the invention are furthermore directed to a transport apparatus in the form of a long stator linear motor comprising at least one transport unit and at least one transport route, an actuator means (or actuator) for changing a magnetic reluctance of the magnetic circuit being provided on the transport apparatus and/or an additional coil for changing the magnetomotive force on the transport unit being provided on the transport unit in order to change a magnetic flux in the magnetic circuit during movement of the transport unit along the transport route.

BRIEF DESCRIPTION OF THE DRAWINGS

The present invention will be described in greater detail in the following with reference to FIGS. 1 to 7B, which schematically show non-limiting, advantageous embodiments of the invention by way of example. In the drawings.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
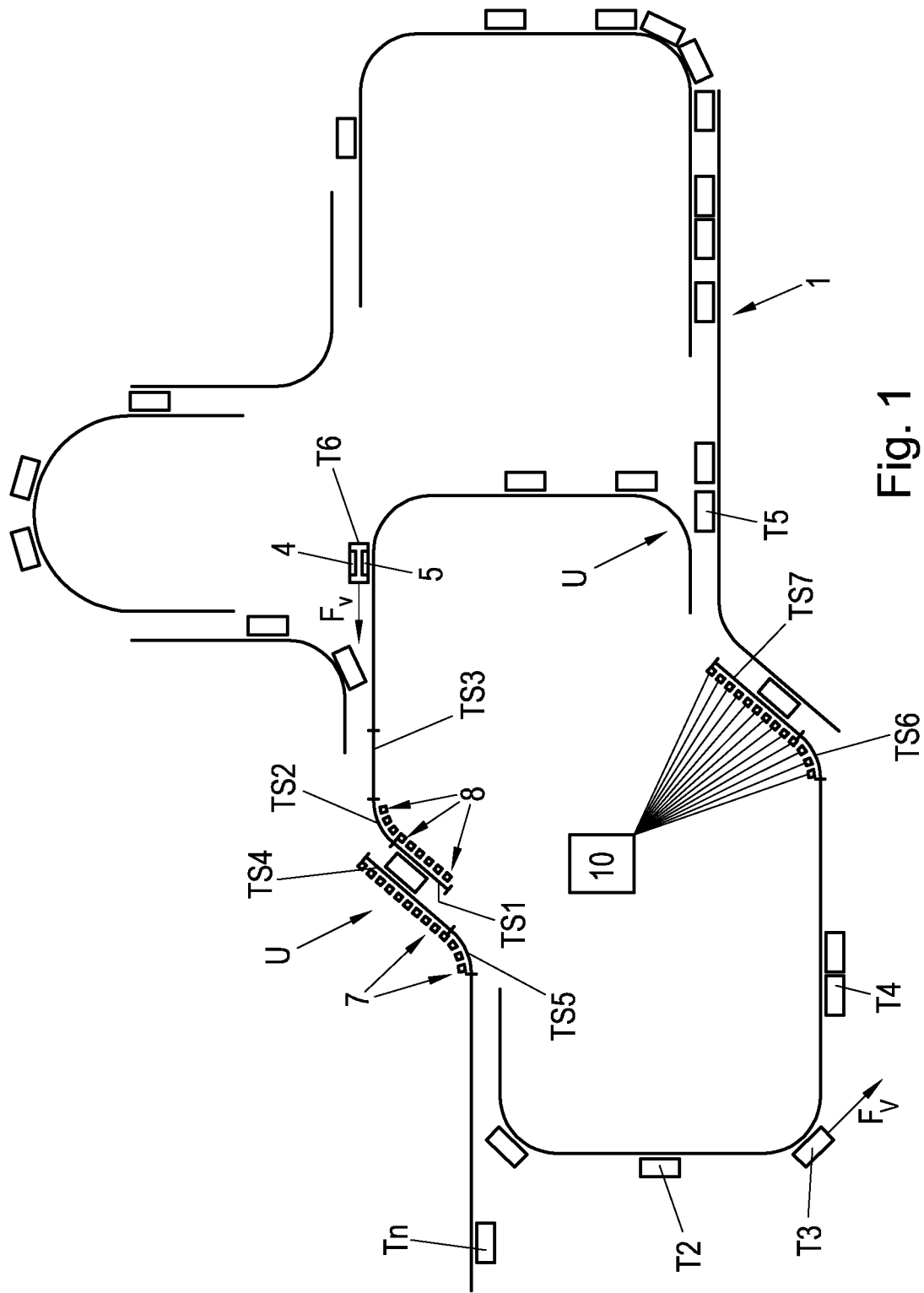
FIG. 1 shows an embodiment of a transport apparatus in the form of a long stator linear motor.

FIG. 1 shows a transport apparatus 1 in the form of a long stator linear motor by way of example. The transport apparatus 1 consists of a number of transport segments TSk (in this case k≥1 is an index denoting all the present transport segments TS1, TS2, TS3, etc.), of which segments only the transport segments TS1 . . . TS7 are denoted by way of example, for reasons of clarity. One transport segment TSk is arranged in each case on one side of the transport route 2. The transport segments TSk form different route portions, for example a straight line, curves having different angles and radii, switches, etc. and can be assembled in a very flexible manner in order to form the transport route 2 of the transport apparatus 1. The transport segments TSk thus together form the stationary transport route 2 along which the transport units Tn (in this case n≥1 is an index denoting all the present transport units T1, T2, T3, T4, etc.) can be moved. This modular structure allows for a very flexible design of the transport apparatus 1. In this case, the transport segments TSk are, of course, arranged on a stationary support structure (not shown). The transport apparatus 1 is designed as a long stator linear motor, in which the transport segments TSk each form a portion of a long stator of the long stator linear motor, in a manner known per se. Therefore, a plurality of electric drive coils 7, 8 which form the stator and are arranged in a stationary manner are arranged in the longitudinal direction, in a known manner (for reasons of clarity, this is indicated in FIG. 1 only for the transport segments TS1, TS2, TS4, TS5, TS6 and TS7), which drive coils can interact with drive magnets 4, 5 on the transport units T1 . . . Tn (for reasons of clarity, this is indicated in FIG. 1 only for the transport unit T6), in order to generate a propulsive force Fv. The drive coils 7, 8 are actuated by a control unit 10 (only indicated in FIG. 1) in a well-known manner, in order to apply the coil voltages required for the desired movement of the transport units Tn.

Along the transport route 2, there may also be route portions on which transport segments TSk are arranged on both sides, between which transport segments a transport unit Tn is moved (for example the transport segments TS1, TS4). If the transport unit Tn is provided with drive magnets 4, 5 on both sides (viewed in the movement direction), the transport unit Tn can also interact, at the same time, with the transport segments TSk, or with the drive coils 7, 8 thereof, arranged on both sides. Thus a greater propulsive force $F_V$ can of course also be generated overall.

Guide elements such as rolls, wheels, glide surfaces, guide magnets, etc. (not shown here for reasons of clarity) can of course also be provided on the transport unit Tn in order to guide the transport unit Tn along the transport route 2 and to hold said transport unit, in particular also when stopped. In this case, for the purpose of guidance, the guide elements of the transport unit Tn interact with the transport route 2 or the transport segments TSk, e.g. by means of the guide elements resting on, hooking onto, sliding on or rolling on, etc. the transport route. An air gap 20 is formed between the drive coils 7, 8 and the drive magnets 4, 5.

Figure 2A:
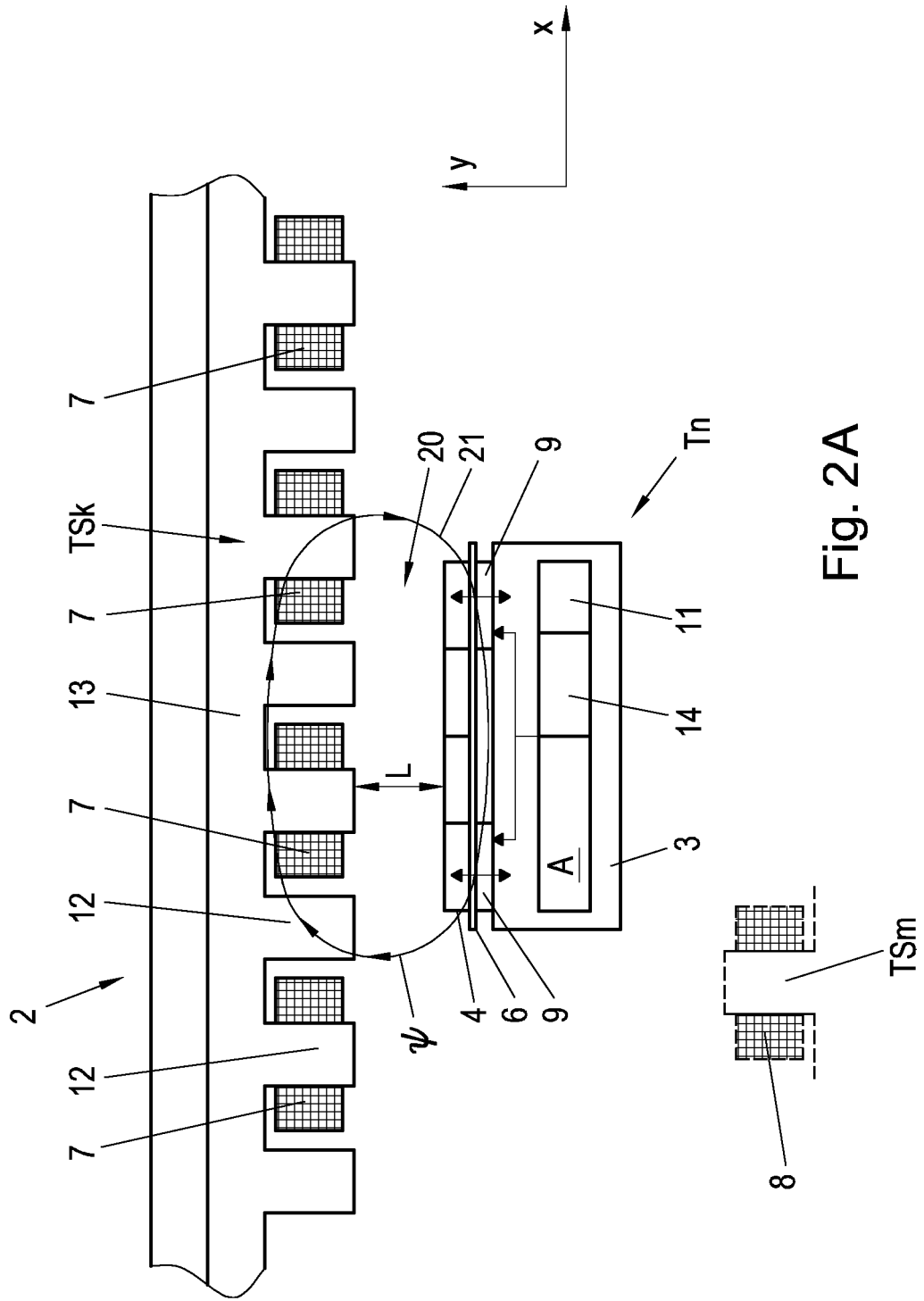
FIG. 2A is a plan view of a transport unit comprising adjustable drive magnets, on a straight route portion of a transport route.

A first embodiment of the invention will be explained with reference to FIG. 2A. FIG. 2A is a plan view of an embodiment of a transport apparatus 1 according to the invention, on a straight route portion of a transport route comprising a transport segment TSk. In a known manner, an air gap 20 having an air gap spacing L is arranged between a drive magnet 4 of the transport unit Tn and the drive coils 7 of the linear stator in the form of the transport segment TSk. A drive magnet 4 may be formed as an electromagnet (excitation coils) and/or as a permanent magnet. The drive coils 7 are preferably arranged on teeth 12 of a ferromagnetic core 13 (for example an iron laminated core). The drive coils 7 can, however, of course also be designed without a core.

In this case, a magnetic circuit 21 (indicated in FIG. 2) forms, in a known manner, between the energized drive coils 7 and the drive magnets 4, in the closed magnetic path of which circuit the magnetic flux $\psi$ develops. In this case, each energized drive coil 7 and each drive magnet 4 can be considered a source of magnetomotive force. This results in a source of magnetomotive force on the transport route 2 (from the individual energized drive coils 7) and a source of magnetomotive force on the transport unit Tn (from the individual drive magnets 4), which sources each generate a magnetomotive force Um. The magnetic circuit 21 has a magnetic reluctance Rm which results, in a known manner, from the different magnetic reluctances of the individual portions of the closed magnetic path. The known relationship Um=Rm·$\psi$ then applies for the magnetic circuit 21. According to the invention, in order to change the magnetic flux $\psi$ in the magnetic circuit 21 while the transport unit Tn is moving along the transport route 2, either the magnitude of the magnetomotive forces Um of the magnetic circuit 21 generated by the sources of magnetomotive force of the transport unit Tn can be changed, and/or the magnetic reluctance Rm of the magnetic circuit 21 can be changed, as will be described in greater detail in the following.

Changing the magnetic reluctance Rm of the magnetic circuit 21 or the magnetomotive force Um of the magnetic circuit 21 on the transport unit Tn while the transport unit Tn is moving along the transport route 2 has hitherto been avoided because the practical implementation thereof is relatively complex compared with changing the coil current of the drive coils 7.

FIG. 2A shows a first embodiment of the invention. In this case, the drive magnets 4 of the transport unit Tn are preferably arranged on a base plate 6 that is connected to the main body 3 of the transport unit Tn by means of at least one first actuator 9, preferably by means of a plurality of first actuators 9. The base plate 6 is preferably made from a solid, ferromagnetic material such as iron, in order to deliberately guide the magnetic field. In this case, an individual first actuator 9, or a plurality of first actuators 9, may also be provided for each drive magnet 4, or one first actuator 9, or a plurality of first actuators 9, may be provided for a plurality of drive magnets 4. The allocation of a first actuator 9 to a drive magnet 4 is irrelevant however. What is important is that at least one drive magnet 4 can be moved by at least one first actuator 9 in at least one of the six possible degrees of freedom of movement. The base plate 6 can also be omitted however, if the at least one first actuator 9 acts directly on the at least one drive magnet 4. In the embodiment shown, the actuator 9 allows for at least one drive magnet 4 to be moved, for example by means of the base plate 6, in the transverse direction y (normal on the movement direction x of the transport unit Tn along the transport route) relative to the main body 3 of the transport unit Tn. On account of the structurally specified guidance of the transport unit Tn in the transverse direction y on the transport route 2 or on a transport segment TSk, which guidance prevents transverse displacement of the transport unit Tn in the transverse direction, moving the drive magnets 4 in the transverse direction y in this manner changes the air gap spacing L of the air gap 20.

The at least one first actuator 9 is actuated by an actuating unit A. It is thus possible, using the at least one first actuator 9, to change the air gap spacing L of the air gap 20 in the region of at least one drive magnet 4, preferably all the drive magnets 4, while the transport unit Tn is moving along the transport route.

Changing the air gap spacing L can of course directly influence the magnetic reluctance Rm of the magnetic circuit 21 and thus the developing magnetic flux $\psi$.

However, the first actuator 9 can also in principle change the position of the at least one drive magnet 4 on the transport unit Tn in any desired manner in order to adjust the magnetic reluctance Rm. If the position of the at least one drive magnet 4 is changed in at least one degree of freedom of movement by means of displacement and/or rotation, in addition to a possible change in the air gap 20 the magnetic path of the magnetic circuit 21, and thus also the magnetic reluctance Rm and the magnetic flux $\psi$ in the magnetic circuit 21 change. If, for example, a drive magnet 4 is rotated by 90°, this has a direct effect on the magnetic path and thus on the magnetic flux $\psi$ in the magnetic circuit 21.

The at least one first actuator 9 is preferably designed so as to be able to apply sufficiently large forces and paths, for moving the drive magnet 4, within a short time, for example within a few milliseconds. Ideally, the air gap spacing L and therefore the magnetic reluctance Rm can be changed within one time step of the control of the drive coils 7 for example. The control time step defines how often a new manipulated variable (e.g. a new coil voltage) can be specified by the control unit 10 and applied to the drive coils 7. In addition, the first actuator 9 for adjusting the air gap spacing L of the air gap 20 and/or for adjusting the magnetic reluctance Rm of the magnetic circuit 21 should have a low energy requirement. The first actuator 9 is preferably formed by a sufficiently quick piezo actuator, although other embodiments having properties similar to a piezo actuator would also be conceivable. In order to supply energy to the at least one first actuator 9 and to the actuating unit A, an energy source 11, such as a battery, may be arranged on the transport unit Tn. The energy could also be provided in another manner however, for example by means of inductive energy transmission from the long stator of from another structural element of the transport route which could also be used to charge an energy source 11. It is in any case important for the transport unit Tn or the at least one first actuator 9 to be supplied, at all times during operation, with sufficient energy for adjusting the at least one drive magnet 4. In order to adjust the air gap spacing L, the actuating unit A can also receive commands from another device of the long stator linear motor 1, for example form the control unit 10, or a separate control unit 14 may be arranged on the transport unit Tn.

Hitherto, in the prior art, a fixed, constant air gap has been provided between drive magnets 4 arranged in a stationary manner on a transport unit Tn and stationary drive coils 7 of a long stator. The disadvantage of this arrangement, however, is that different spacings L result between the individual drive magnets 4 of the transport unit Tn and the drive coils 7 of the long stator of the long stator linear motor, in particular in the case of long transport units Tn on strongly curved transport routes. When the transport unit Tn moves along the curved transport route 2, these different spacings L lead to significant flux fluctuations and require more extensive control intervention on the drive coils 7 by means of the control unit 10 in order to maintain the desired propulsive force Fv.

Figure 2B:
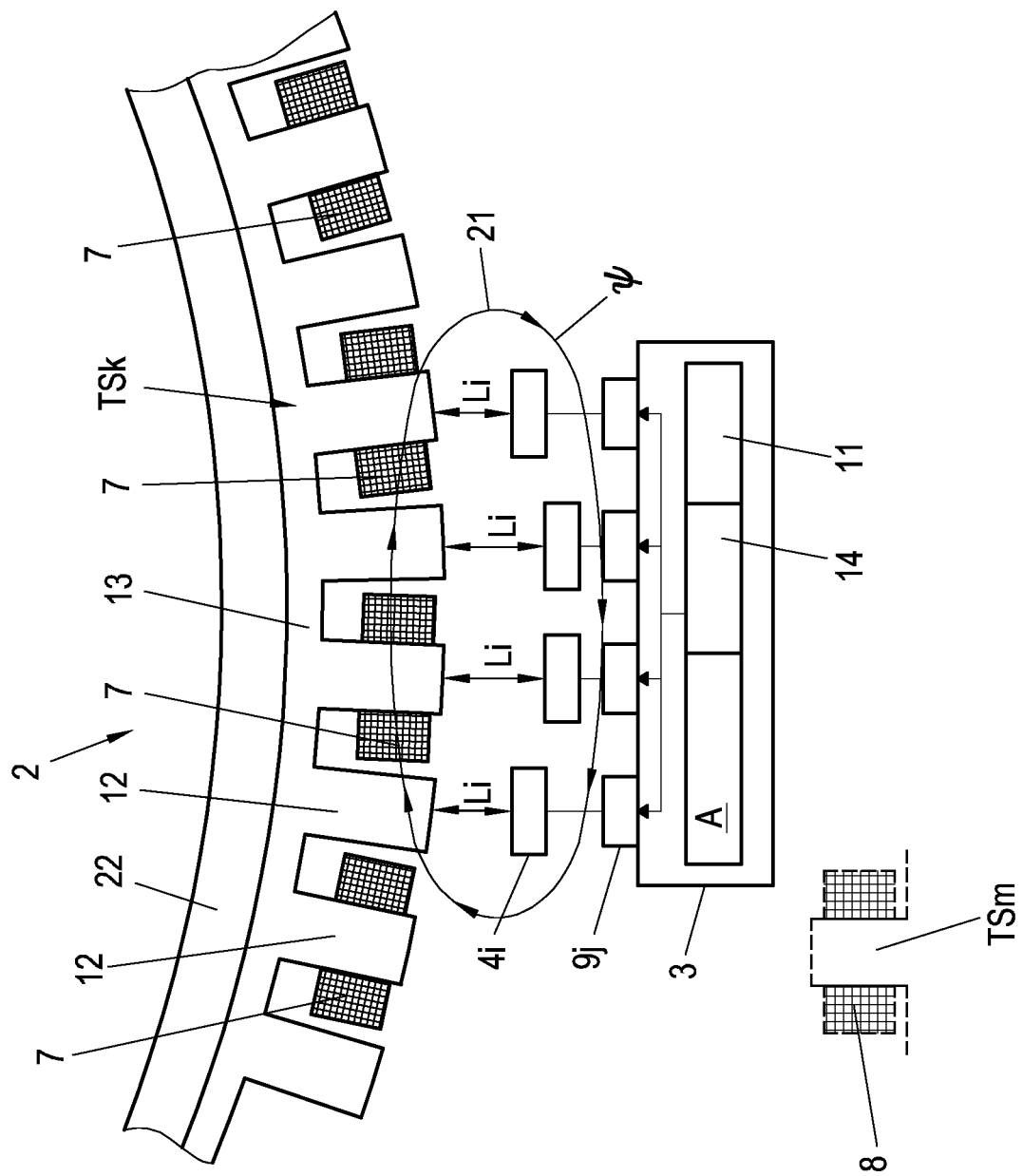
FIGS. 2B and 2C are plan views of a transport unit comprising adjustable drive magnets, on a curved route portion of a transport route.

FIG. 2B shows such an embodiment of the invention, in a plan view of the transport apparatus 1 in the region of a curved route portion of a transport route 2. In this case, in contrast with the previously described embodiment according to FIG. 2A, no base plate 6 is provided between the at least one first actuator 9 and the drive magnets 4, but instead the positions of individual drive magnets 4i can in this case be changed individually, in one degree of freedom of movement in each case, here in the transverse direction y, by means of corresponding first actuators 9j. It would of course also be conceivable, however, to move the positions of the drive magnets 4i in a plurality of degrees of freedom of movement, e.g. a movement in the transverse direction Y and a rotation about the y-axis, or other combinations of the six possible degrees of freedom of movement. In order to change the magnetic reluctance Rm of the magnetic circuit 21, in the embodiment shown in FIG. 2B in each case only the spacing Li between the corresponding drive magnet 4i of the transport unit Tn and the drive coils 7 of the long stator that interact therewith is adjusted. This makes it possible, even in the case of curved travel, i.e. in a curved portion of a transport route, to achieve an approximately constant air gap spacing Li between individual drive magnets 4i and the drive coils 7 that interact therewith, i.e. over the entire length of the transport unit Tn.

For this purpose, in order to change the magnetic reluctance Rm of the magnetic circuit 21, a first actuator 9j is preferably assigned to each drive magnet 4i of the transport unit Tn, such that the position of each drive magnet 4i can be adjusted individually, as shown in FIG. 2B (in this case, the indices i and j indicate the number of drive magnets 4 and first actuators 9, respectively). It may also be sufficient, however, to adjust not all but instead only specific drive magnets 4i, for example the first and last drive magnet 4i viewed in the movement direction x.

Figure 2C:
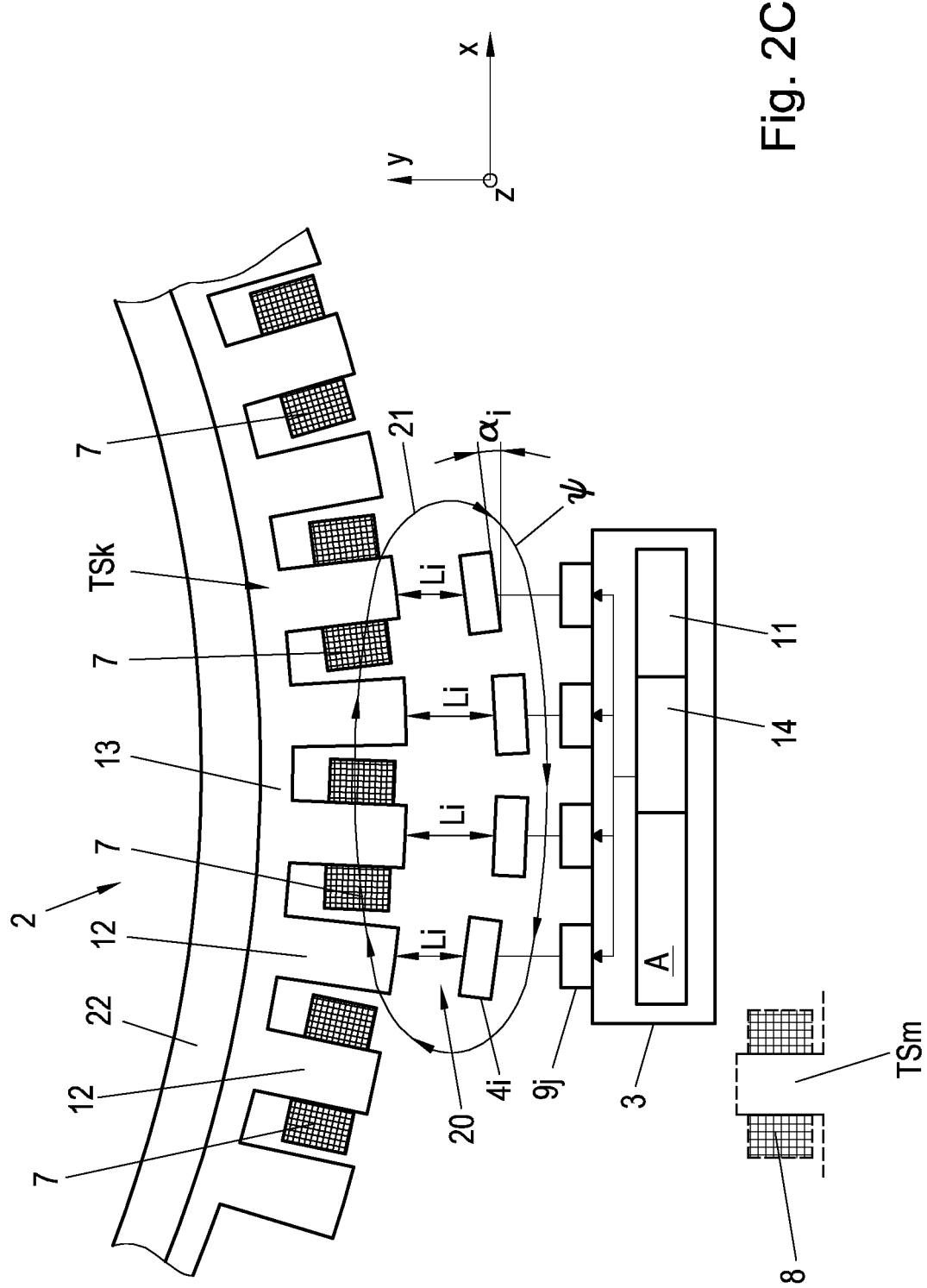

In the embodiment according to FIG. 2C, the position of at least one drive magnet 4i can be changed in a second degree of freedom of movement (in this case an angle $\alpha i$ about the z-axis). It is thus possible, using at least one corresponding first actuator 9j, to individually adjust not only the air gap spacing Li between at least one drive magnet 4i of the transport unit Tn and at least one drive coil 7 of the transport route 2 that interacts therewith, but also the angle $\alpha i$ of the transport unit Tn between the at least one drive magnet 4i and the at least one drive coil 7 of the transport route 2 that interacts therewith. Advantageously, however, a plurality of drive magnets 4i are adjusted by means of a plurality of corresponding first actuators 9j, as a result of which it is possible to achieve, for example, an approximately uniform air gap spacing L over the entire length of the transport unit Tn, as shown in FIG. 2C.

It would of course also be conceivable to adjust only the first and the last drive magnets 4i of the transport unit Tn for example, using corresponding first actuators 9j, and to arrange the drive magnets 4i therebetween on a common base plate 6 that can be adjusted by one or more first actuators 9j, similarly to the embodiment according to FIG. 2A. It would also be conceivable to design each individual drive magnet 4i so as to be adjustable (e.g. in FIG. 2B, drive magnet 4i using actuator 9i), or to arrange the drive magnets 4i for example in pairs in each case on a smaller base plate 6 that may be adjustable by means of one or more first actuators 9j. In principle, a plurality of embodiments of this kind are conceivable, and it is possible to select an embodiment of the invention according to the type and design of the transport unit Tn and the transport route, for example depending on the length of the transport unit Tn, the number of drive magnets 4i of the transport unit Tn, or the curvature of the transport route. Of course, the change in the position is not restricted to the examples mentioned, but any other desired combinations of degrees of freedom of movement would also be conceivable for adjusting the positions of the drive magnets 4i and thus deliberately influencing the magnetic reluctance Rm and consequently the magnetic flux $\Psi$ of the magnetic circuit 21.

According to another embodiment of the invention, in order to change the magnetic reluctance Rm of the magnetic circuit 21, the position of at least one drive coil 7 of the transport route 2 can be changed, in at least one degree of freedom of movement, by means of at least one second actuator 16, 17 that is arranged on the transport route 2 and interacts with the at least one drive coil 7 of the transport route 2, as will be described in the following with reference to FIGS. 3A and 3B.

Figure 3A:
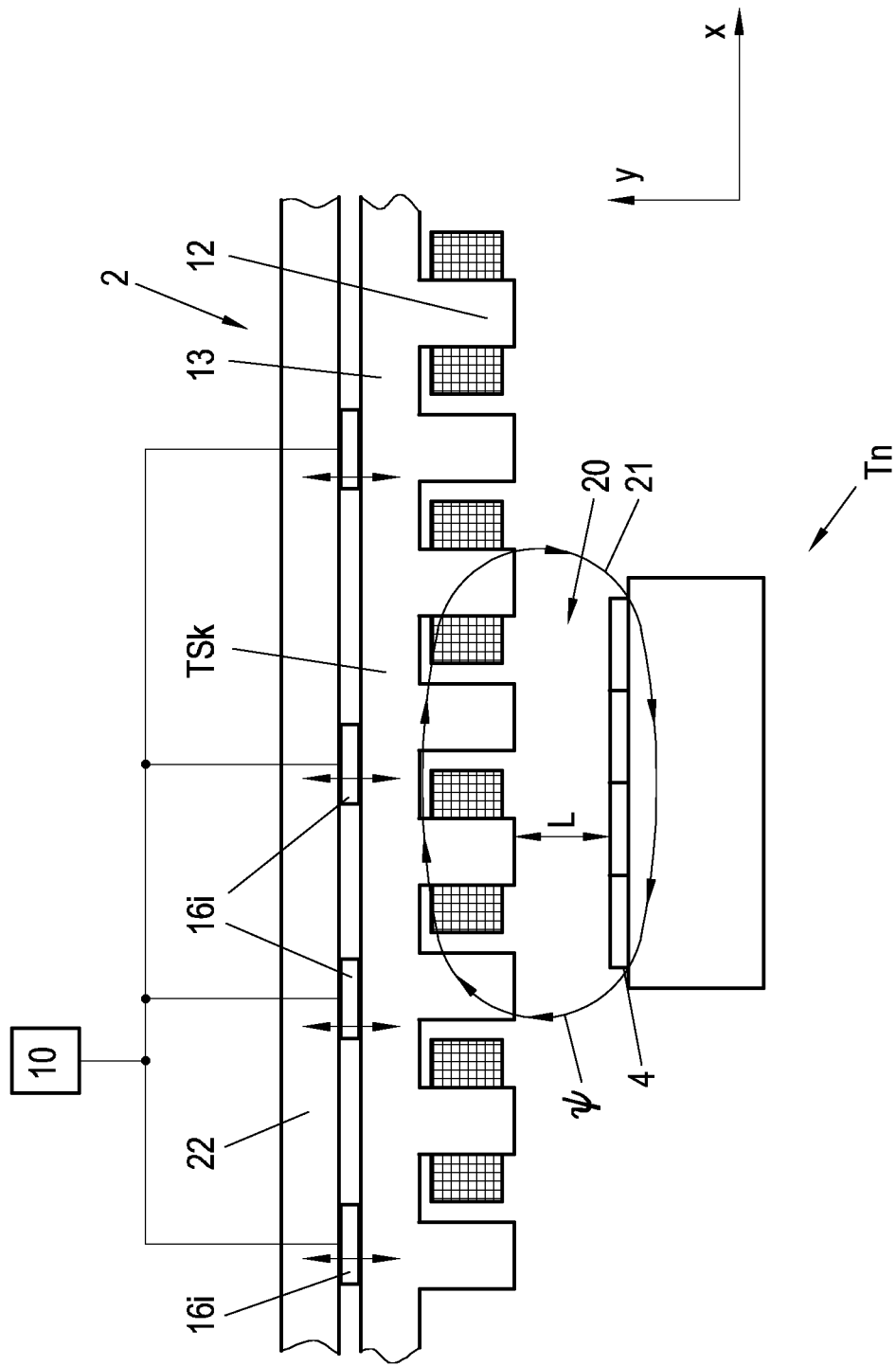
FIGS. 3A and 3B are plan views of a transport unit comprising adjustable drive coils, on a straight route portion of a transport route.

FIG. 3A is a plan view of a transport unit Tn on a straight route portion of a transport route 2. In this case, in order to change the air gap spacing L (and consequently the magnetic reluctance Rm of the magnetic circuit 21) between the drive magnets 4 of the transport unit Tn and the drive coils 7 of the transport route 2 or of a transport segment TSk that interact therewith, a plurality of second actuators 16*i* are arranged on the transport route 2. For example, the second actuators 6*i* may be arranged between the stationary support structure 22 of the transport route 2 and a transport segment TSk, and actuated by the control unit 10 for example. Similarly to the first actuators 9*i*, the second actuators 16*i* may also be designed for example as piezo actuators or as other suitable actuators. The second actuators 16*i* are actuated, preferably by the control unit 10, such that for example one transport segment TSk comprising drive coils 7 arranged thereon can be adjusted in the transverse direction Y while the transport unit Tn moves along the transport route 2. As a result, the air gap spacing LI between the drive magnets 4 and the drive coils 7 of the transport segment TSk is changed, with the result that the magnetic reluctance Rm and consequently the magnetic flux Ψ of the magnetic circuit 21 can be deliberately influenced. Combining this with the adjustment of the position of the drive magnets 4 of the transport unit Tn (as described with reference to FIG. 2A-2C) would of course also be conceivable, for example in order to increase the effect of the change in the magnetic reluctance Rm, or if the achievable paths or strokes of the first and/or second actuators 9*i*, 16*i* are limited.

Figure 3B:
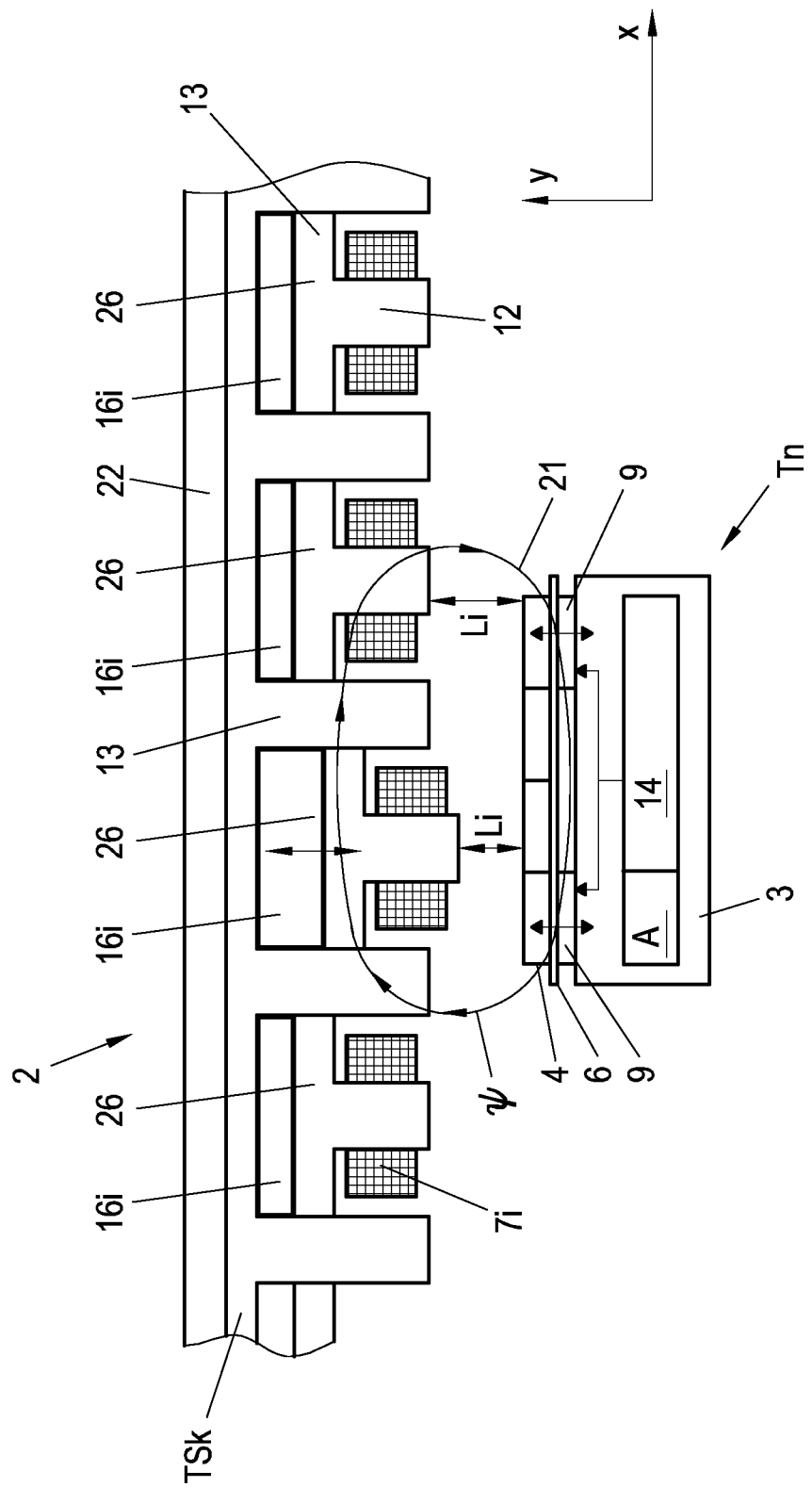

FIG. 3B shows a further embodiment, the second actuators 16*i* being arranged on movable coil segments 26 of a transport segment TSk, as a result of which the positions of the drive coils 7*i* including part of the ferromagnetic core 13, in particular the teeth 12 of the core 13, can be individually adjusted in at least one degree of freedom of movement, preferably in the transverse direction Y. The specific embodiment of the coil segments 26 is not crucial in this case, e.g. it would be conceivable to arrange the coil segments 26 on the transport segment TSk so as to be movable by means of suitable guides, such that the position of the coil segments 26 can be changed by means of the second actuators 16*i*. Adjusting the coil segments 26 and the drive coils 7*i* arranged thereon in the y-direction makes it possible (similarly to the embodiment according to FIGS. 2B and 2C) to individually adjust the air gap spacing Li between individual drive coils 7*i* and the drive magnets 4*i* that interact therewith, and this directly influences the magnetic reluctance Rm of the magnetic circuit 21 and consequently the magnetic flux 4'. Here, too, the second actuators 16*i* are preferably formed by piezo actuators or other suitable actuators, which can be actuated by the control unit 10 (not shown in FIG. 3B) for example. It is of course also possible, for example, to combine this with adjustable drive magnets 4*i* according to one of the variants described. FIG. 3B, for example, shows the variant similar to the embodiment described with reference to FIG. 2A, drive magnets 4 of the transport unit Tn being arranged on a common base plate 6 that is adjustable in the y-direction. The base plate 6 is actuated by the control unit 14 of the actuating unit A, by means of a first actuator 9, such that the drive magnets 4 can be moved in the y-direction, as a result of which the magnetic reluctance Rm of the magnetic circuit 21 can be changed, and therefore the magnetic flux Ψ.

In principle, the exact configuration of the adjustment of the position of a drive coil 7*i* and/or of a drive magnet 4*i* is not crucial to the invention; all that is important is that the position of at least one drive coil 7*i*, preferably a plurality of drive coils, can be changed in at least one degree of freedom of movement, such that the magnetic reluctance Rm of the magnetic circuit 21 can be changed. There is of course a plurality of options for implementing this.

For reasons of simplicity, the embodiments have been described with reference to a single-sided embodiment of the transport route 2, but the invention of course also includes a double-sided embodiment in which drive magnets 4*i*, 5*i* and transport segments TSk. TSm comprising drive coils 7*i*, 8*i* are arranged on both sides of the transport unit Tn, viewed in the movement direction x. It is thus possible for the transport unit Tn to comprise drive magnets 4*i*, 5*i*, adjustable by means of first actuators 9*i*, 10*i*, on both sides, and for the transport route 2 to comprise drive coils 7*i*, 8*i*, adjustable by means of second actuators 16*i*, 17*i*, on transport segments TSk, TSm arranged on both sides of the transport unit Tn (transport segment TSm and second actuators 17*i* are not shown in FIGS. 3A and 3B; the embodiment is similar to the transport segment TSk and the second actuators 16*i*). Combinations would of course also be conceivable.

Figure 4:
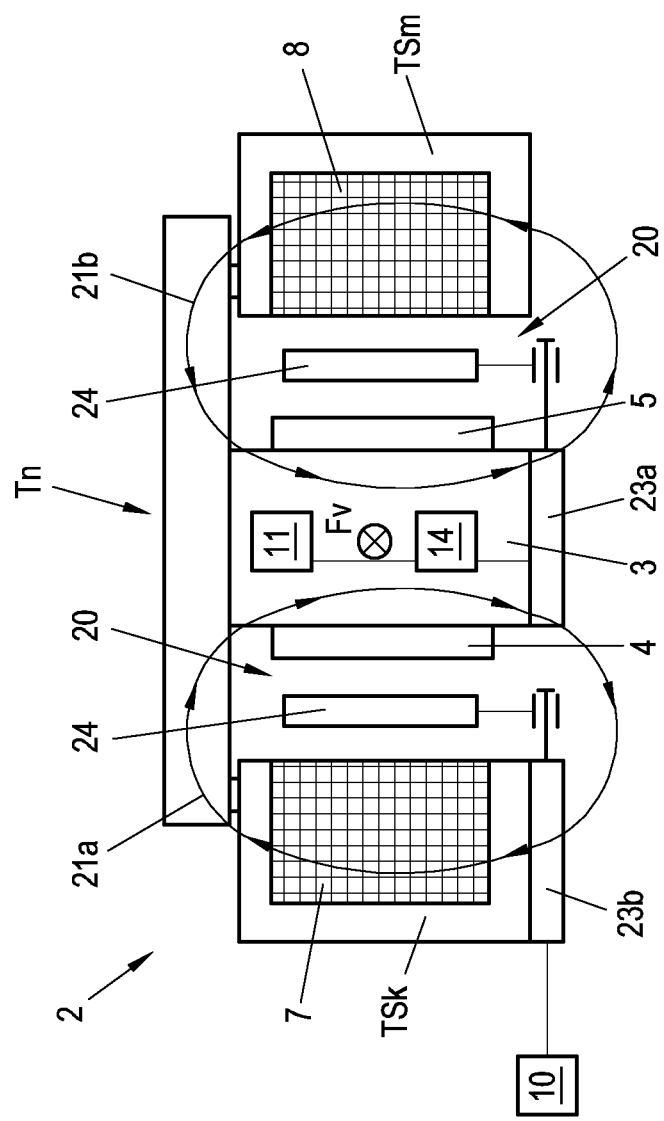
FIG. 4 is a cross-section through a transport unit comprising reluctance elements, on a double-sided route portion of a transport route.

A further embodiment of the invention is shown in FIG. 4, in a cross-section through a transport unit Tn in the region of a double-sided transport route 2. The transport unit Tn comprises drive magnets 4, 5 on both sides, and the transport route 2 comprises transport segments TSk, TSm on both sides, on which transport segments drive coils 7, 8 are arranged which interact, in a known manner, with the drive magnets 4, 5 on the corresponding side of the transport unit Tn in order to generate a propulsive force Fv. According to the invention, in order to change the respective magnetic reluctances Rm of the magnetic circuits 21*a*, 21*b* of the two sides, at least one magnetic reluctance element 24 is provided which is inserted between drive magnets 4, 5 and drive coils 7, 8 by means of a third actuator 23*a*. 23*b* arranged on the transport unit Tn or on the transport route 2. The reluctance element 24 is preferably designed so as to have a specific magnetic permeability μ for influencing the magnetic reluctance Rm of the corresponding magnetic circuit 21*a*, 21*b*. Depending on the embodiment desired, the material of the magnetic reluctance element 24 can be selected such that the magnetic reluctance Rm of the corresponding magnetic circuit 21*a*, 21*b* can be increased or reduced. As can be seen in FIG. 4, the at least one third actuator 23*a*, 23*b* can be arranged either on the transport unit Tn (actuator 23*a*) or on the transport route 2 (actuator 23*b*). For example, the at least one third actuator 23 could again be designed as a piezo actuator or another suitable actuator. A third actuator 23*b* arranged on the transport route 2 could be actuated by the control unit 10 for example, and an actuator 23*a* arranged on the transport unit Tn could be actuated by the control unit 14 for example. Depending on the specific embodiment, it would be conceivable for example to swivel or push the magnetic reluctance element 24 into the air gap 20 using a suitable mechanism, or to insert said element into the air gap 20 in another suitable manner. The exact embodiment is not crucial to the invention, however; what is important is that the magnetic reluctance element 24 can be inserted into the air gap 20 in a sufficiently short amount of time, such that the magnetic reluctance Rm of the magnetic circuit 21*a*, 21*b* can be deliberately changed, and consequently the magnetic flux Ψ in the magnetic circuit 21*a*, 21*b*. Of course, a reluctance element 24 of this kind can also be used in a single-sided arrangement, such as in FIG. 2A or FIG. 3A.

Figure 4A:
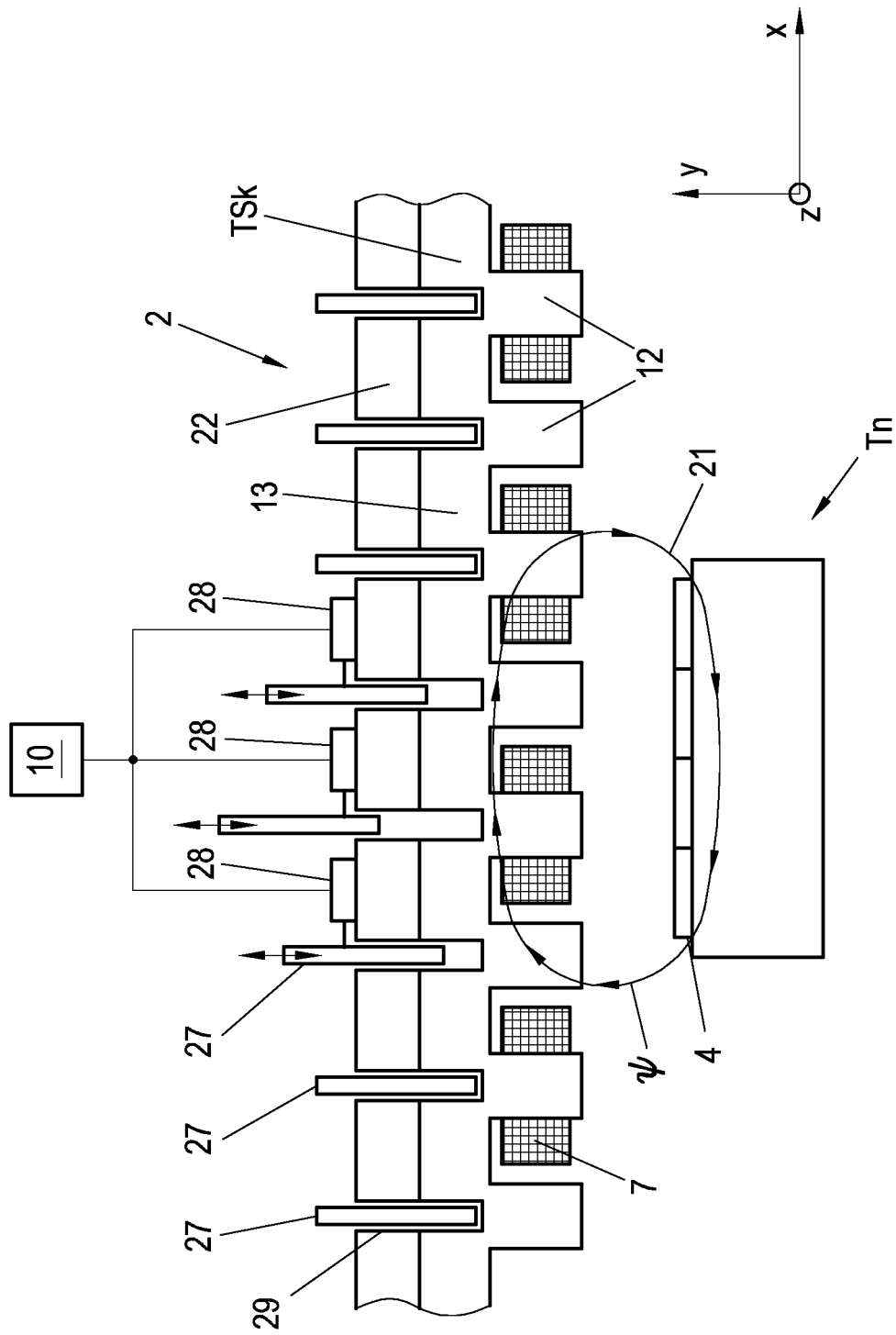
FIG. 4A is a plan view of a transport unit comprising reluctance elements on the stator side, on a straight route portion of a transport route.

A further embodiment of the invention is shown in FIG. 4A. According to the invention, in order to change the magnetic reluctance Rm des magnetic circuit 21, openings 29 are provided on the transport route 2, into which openings magnetic reluctance elements 27 can be inserted. For this purpose, fourth actuators 28 are arranged on the transport route 2, by means of which actuators the magnetic reluctance elements 27 can be moved into the opening 29 and out of the opening 29, as indicated by the double arrow in FIG. 4A, in order to change the magnetic reluctance Rm of the magnetic circuit 21. In this case, as shown in FIG. 4A, the opening 29 can be formed so as to extend on the transport route 2, in the transverse direction, i.e. in the y-direction, through the support structure 22 and into the ferromagnetic core 13 of the transport segment TSk. What is important here is that the opening 29 extends into the core 13 (or into the region in which the magnetic circuit 21 forms), such that the magnetic reluctance element 27 can influence the magnetic reluctance Rm of the magnetic circuit 21, propagating in the core 13, when said element is moved into or out of the opening 29. The drawing in FIG. 4A is of course to be understood to be by way of example, and more or fewer openings 19, magnetic reluctance elements 27 and fourth actuators 28 could also be provided. The size and shape of the openings 29 and magnetic reluctance elements 27 can also be selected as desired. In order to increase the influence on the magnetic circuit 21, it would also be conceivable, for example, for the openings 29 to extend as far as the teeth 12 of the core 13. In the case of openings 29 that extend in the y-direction, the magnetic reluctance elements 27 and the fourth actuators are then of course designed such that the magnetic reluctance elements 27 are movable in the y-direction. Depending on the embodiment desired, the material, i.e. substantially the magnetic permeability μ, of the magnetic reluctance element 27 can be selected such that the magnetic reluctance Rm of the magnetic circuit 21 can be increased or reduced when the magnetic reluctance element 27 is inserted. The fourth actuator 28 arranged on the transport route 2 could be actuated by the control unit 10 for example. It would also be conceivable, however, for the openings 29 to be arranged on the transport route 2 such as to extend not in the y-direction but instead in the z-direction, and such that the magnetic reluctance element 27 is accordingly arranged so as to be displaceable in the z-direction. The exact embodiment is not crucial to the invention, however; what is important is that the magnetic reluctance element 27 can be swiveled or pushed, by means of a suitable mechanism, or inserted in another suitable manner, into the opening 29 in a sufficiently short amount of time, such that the magnetic reluctance Rm of the magnetic circuit 21 can be deliberately changed, and consequently the magnetic flux 4I in the magnetic circuit 21.

Figure 5:
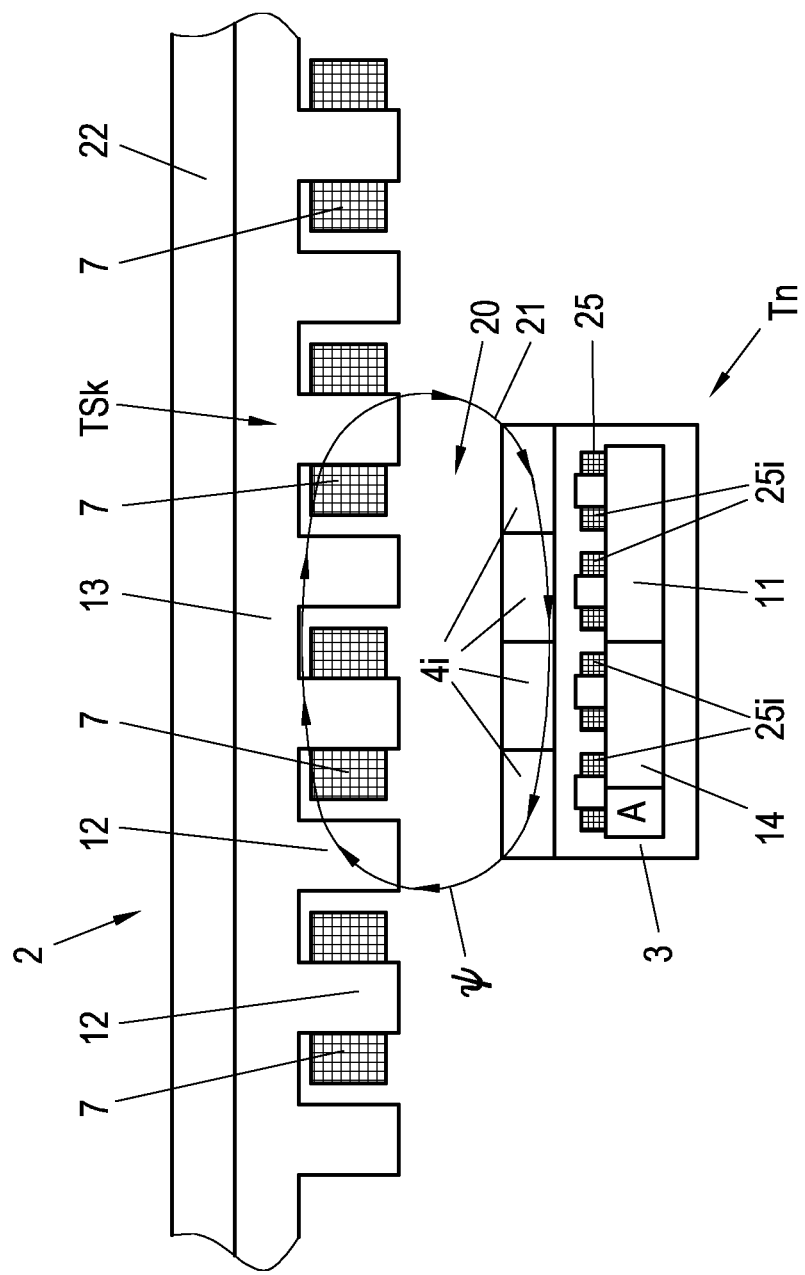
FIG. 5 is a plan view of a transport unit comprising additional coils, on a straight route portion of a transport route.

A further embodiment of the invention is shown in FIG. 5, in a plan view of a transport unit Tn on a route portion of a transport route 2. In contrast to the embodiments described thus far, it is now not the magnetic reluctance Rm of the magnetic circuit 21 that is changed, but rather the magnetomotive force Urn generated on the transport unit Tn. In order to change the magnetomotive force Um on the transport unit Tn, at least one additional coil 25 is arranged on the transport unit Tn, it being possible for an electrical boost voltage Uz to be applied to the additional coil 25, at least intermittently, in order to at least intermittently increase or reduce the magnetomotive force Um on the transport unit Tn, as a result of which a magnetomotive boost force Umz is generated that is oriented in the same direction as or counter to the magnetomotive force Um of the drive magnets 4*i* and as a result of which an additional magnetic flux Ψz can be generated which increases or reduces the magnetic flux Ψ of the magnetic circuit 21. Preferably a plurality of additional coils 25*i* is arranged on the transport unit, for example one additional coil 25*i* per drive magnet 4*i*. The additional coils 25*i* can be supplied with the boost voltage Uz by means of the energy source 11 arranged on the transport unit Tn, and can be actuated by the control unit 14 of the actuating unit A of the transport unit Tn. As a result of the boost voltage Uz being applied at least intermittently, a magnetomotive boost force Umz is generated by the additional coils 25*i*, which magnetomotive boost force is superimposed on the magnetomotive force Um of the drive magnets 4*i*. The magnetic flux Ψ of the magnetic circuit 21 can thus be deliberately changed or increased, in accordance with the relationship Um=Rm*Ψ.

According to the invention, the method described thus far for changing the magnetic flux Ψ of the magnetic circuit 21 can be used particularly advantageously to compensate for guidance inaccuracies of a transport route 2, to increase the maximum achievable speed $V_{max}$ of a transport unit Tn, or to transfer a transport unit Tn in a transfer position U of a double-sided transport route 2, as will be explained in greater detail in the following.

According to a first use of one of the described methods according to the invention, an actual magnetic flux $Ψ_{ist}$ is determined in the magnetic circuit 21, and a control unit 10, 14 controls the actual magnetic flux $Ψ_{ist}$ to a defined target magnetic flux $Ψ_{soll}$ by means of the magnetic reluctance Rm and/or the magnetomotive force Um on the transport unit Tn being changed by the control unit 10, 14. In this context, however, "controlling" does not necessarily mean closed-loop control comprising feedback of a determined actual magnetic flux $Ψ_{ist}$ (or a physically equivalent variable), but instead regulated open-loop operation would also be conceivable. For example, for this purpose, characteristic curves for example of a target magnetic flux $Ψ_{soll}$ could be stored in the control unit 10, 14, the control unit 10, 14 actuating the available actuators 9, 16, 23 in accordance with the characteristic curves. The actual magnetic flux $Ψ_{ist}$ can be measured in a known manner, or can be estimated, from available measured values, in an observer. As has already been described in detail, the magnetic flux Ψ of the magnetic circuit 21 can be changed in various manners, for example by changing the position of the drive magnets 4, 5 of the transport unit Tn, by changing the position of the drive coils 7, 8 of the transport route 2, by inserting a magnetic reluctance element 24 into the air gap 20, by inserting a magnetic reluctance element 27 into an opening 29 in the transport route 2, or by changing the magnetomotive force Um on the transport unit Tn. In the case of straight or slightly curved transport routes 2 it may be sufficient, for example, to arrange the drive magnets 4 on a common base plate 6 and to adjust the base plate 6 in the y-direction, by means of at least one first actuator 9, in order to change the air gap spacing L in the air gap 20, and thus the magnetic reluctance Rm and consequently the magnetic flux Ψ of the magnetic circuit 21. Alternatively, for example the position of at least one drive coil 7 of the transport route 2 may be changed by means of at least one second actuator 16, preferably in the y-direction. In the case of more strongly curved transport routes, it is advantageous for at least the air gap spacing Li of individual drive magnets 4*i* to be adjustable individually by means of at least one first actuator 9, preferably a plurality of first actuators 9*j*. In order to additionally increase the uniformity of the air gap 20, individual drive magnets 4*i* may, however, also be designed so as to be angularly adjustable, it being possible for the angle $α_i$ in the air gap 20, between the individual drive magnets 4i and the drive coils 7 that interact therewith, to be adjusted by means of at least one first actuator 9, preferably by means of a plurality of first actuators 9j.

In order that the transport units do not fall off the transport route 2, in particular in the case of curves, guide elements (not shown) may be arranged on a transport unit Tn, which elements interact with the transport route, i.e. for example are supported thereon by means of suitable guide elements, in older to guide the transport unit Tn. The accuracy of guidance of this kind is dependent on various influencing factors, such as manufacturing tolerances of the individual components, wear on the transport route 2 and the guide components, maintenance, etc. For example, there may be regions of the transport route 2 that are subject to more wear and regions subject to less wear, for example due to different loads and/or speeds of the transport units Tn. The transport unit Tn is of course also subject to wear, which may result in the play of the mechanical guide elements increasing. Wear on the transport unit Tn and/or on the transport route 2 may, for example, result in the size of the air gap 20, i.e. the spacing L between the drive magnets 4 of the transport unit Tn and the drive coils 7 of the long stator, changing when the transport unit Tn moves along the transport route 2, which would accordingly lead to magnetic fluxes $\Psi$ of different magnitudes in the magnetic circuit 21. Consequently, assuming for example a desired constant propulsive force Fv of the transport unit Tn, the controller (control unit 10) would have to continuously adapt the coil voltage of the drive coils 7 to the movement of the transport unit Tn in order to compensate for the fluctuating magnetic flux $\Psi$, which would increase the demands on the control due to the necessary dynamics of the control (extensive control intervention in short time steps). Changing the magnetic flux $\Psi$ in the manner according to the invention and already described in detail now makes it possible to compensate for guidance inaccuracies of this kind by means of control that is decoupled therefrom (control unit 14 of the transport unit or additional control in the control unit 10), by means of the magnetic flux $\Psi$ in the magnetic circuit 21 being controlled independently of the control of the movement of the transport unit Tn, as will be described in the following with reference to FIG. 5.

Figure 6:
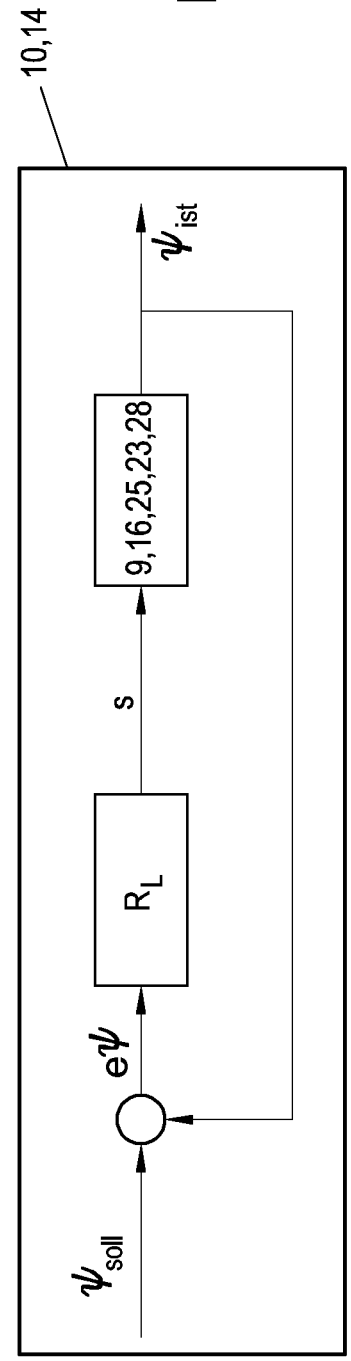
FIG. 6 shows a control structure according to the invention.

FIG. 6 is a block diagram of a control structure according to the invention. The controlled variable is the actual magnetic flux $\Psi_{ist}$ of the magnetic circuit 21, and the reference variable is the target magnetic flux $\Psi_{soft}$ of the magnetic circuit 21. The actual magnetic flux $\Psi_{ist}$ can be determined on the long stator using a suitable observer, or can be determined by means of a measurement. In order to form a control error $e\Psi$, the actual magnetic flux $\Psi_{ist}$ is compared with the target magnetic flux $\Psi_{soil}$. The control error $e\Psi$ is (depending on the embodiment) corrected either in the control unit 10 of the transport route 2 and/or in the control unit 14 of the transport unit Tn, by means of a suitable controller $R_L$, for example a simple PID or PI controller or any other desired controller, by means of the controller $R_L$ calculating a manipulated variable s which is converted by the at least one first actuator 9 into a change in the position of the associated at least one drive magnet 4 and/or is converted by the at least one second actuator 16 into a change in the position of the associated at least one drive coil 7 and/or is converted by the at least one third actuator 23 into a movement of the at least one magnetic reluctance element 24 and/or is converted by the at least one fourth actuator 28 into a movement of the at least one magnetic reluctance element 27 and/or is converted into a boost voltage Uz to be applied to the at least one additional coil 25 of the transport unit Tn. In the case of a piezo actuator as the actuator 9, 16, 23, 24, the manipulated variable s may be an electrical voltage signal for example. In order to adjust a desired control characteristic, such as response behavior, dynamics, overshoot, damping, the controller parameters of the controller(s) $R_L$ can be set or specified according to the design thereof. The control unit 10, 14 may be in the form of hardware, e.g. as a separate component, or may be integrated into a control unit of the long stator linear motor for example, in the form of software. In the embodiments shown (FIGS. 2A-2C and FIG. 4), the control unit 14 can be integrated in the transport unit Tn, e.g. in the actuating unit A of the transport unit Tn. In this case, the controller $R_L$ is generally implemented as software.

In order to compensate for guidance inaccuracies of the transport route 2, for example a desired constant air gap 20 that corresponds to the target magnetic flux $\Psi_{soil}$ can be specified and controlled by means of selecting a specific target magnetic flux $\Psi_{soil}$.

According to a further use of the method according to the invention for changing the magnetic flux $\Psi$ of the magnetic circuit 21, the maximum achievable speed $V_{max}$ of the transport unit Tn can be increased in a simple manner, as described below. In principle, the maximum achievable speed $V_{max}$ of a transport unit Tn is limited by the maximum coil voltage that can be applied to the drive coil 7. The maximum coil voltage that can be applied is substantially specified by the rating of the power electronics units of the drive coil 7. The power electronics units may be integrated in the control unit 10 but may also be separate hardware components. In this case, coil voltages that are as low as possible are of course desired, for thermal reasons.

On account of the physical law of induction, the moving magnetic field of the drive magnet 4 of a moving transport unit in induces what is known as an EMF voltage $U_{EMF}$ (EMF=electromotive force) in a drive coil 7 of the long stator, which force counteracts the applied coil voltage on the drive coil 7 and generates what is known as a counter EMF. The greater the speed of the transport unit Tn, the higher the EMF voltage $U_{EMF}$, and thus the counter EMF. The maximum speed $V_{max}$ of the transport unit Tn is achieved when the magnitude of the induced EMF voltage $U_{EMF}$ corresponds to the applied coil voltage on the drive coil 7, because the drive coil 7 then cannot consume any more current. Although it would in principle be possible to increase the applied coil voltage on the drive coil 7 of the long stator, said coil voltage is in practice limited by a specified maximum voltage of the power electronics units and also by thermal limitations. In general, the EMF voltage $U_{EMF}$ is proportional to the speed V of the transport unit Tn and to the magnetic flux $\Psi_p$ of the drive magnet 4 and any additional coils 25 that may be provided, as the following relationship shows.

$$U_{EMK} \alpha V^{TM} \Psi_p$$

In said relationship, the magnetic flux $\Psi_p$ relates to the magnetic flux generated by the drive magnet 4 and to the additional magnetic flux $\Psi_p$ of one or more additional coil(n) 25 that may be arranged on the transport unit Tn, since only said flux $\Psi_p$ moves relative to the stationary drive coils 7, on account of the speed V of the transport unit Tn, and induces a voltage in the drive cods 7. In contrast, the magnetic flux $\Psi$ in magnetic circuit 21, mentioned further above, is the magnetic flux resulting on the basis of the sources of magnetomotive force (drive magnets 4, drive coils 7 and optional additional coils 25).

However, if the maximum achievable speed $V_{max}$ of the transport unit Tn is nonetheless still intended to be increased at least intermittently, for example in order to move a transport unit Tn as quickly as possible from one work station of a production process to the next work station, but without increasing the coil voltage in the process, according to the invention the magnetic flux Ψ of the magnetic circuit 21 is reduced by means of changing the magnetic reluctance Rm and/or the magnetomotive force Um on the transport unit Tn. In this case, the magnetic reluctance Rm and/or the magnetomotive force Um can be changed using one of the methods already described in detail, but it would also be conceivable to combine a plurality of the methods. It would therefore be conceivable to arrange just one first actuator 9 (or a plurality of first actuators 9) on the transport unit Tn, by means of which first actuator the magnetic reluctance Rm of the magnetic circuit 21 is increased by changing the position of the drive magnets 4. It is also possible, however, for just one second actuator 16 (or a plurality of second actuators 16) to be arranged on the transport route 2, by means of which second actuator the position of at least one drive coil 7 of the transport mute 2, and thus the magnetic reluctance Rm of the magnetic circuit 21, can be increased. It would also be conceivable to increase the magnetic reluctance Rm by means of one (or more) magnetic reluctance element 24 that is to be removed from the air gap 20 between at least one drive magnet 4 of the transport unit Tn and at least one drive coil 7 of the transport route 2 that interacts therewith (or analogously using a reluctance element 27 on the stator side). Otherwise, the magnetomotive force Um on the transport unit Tn could be reduced by applying a magnetomotive boost force Umz that is generated by an additional coil 25 arranged on the transport unit Tn and is oriented counter to the magnetomotive force Um of the drive magnets. Assuming an unchanged coil voltage in the drive coils 7, increasing the magnetic reluctance Rm of the magnetic circuit 21 reduces not only the magnetic flux Ψ of the magnetic circuit 21, but of course also the magnetic flux $Ψ_p$ caused by the drive magnet 4, and thus also the EMF-voltage $U_{EMF}$. This makes it possible, however, to increase the maximum achievable speed $V_{max}$ of the transport unit Tn as a direct consequence. When the EMF voltage is lower, a drive coil 7 can consume more current at the same speed V, making it possible to increase the maximum achievable speed $V_{max}$ of the transport unit Tn. The fact that the achievable propulsive force $F_V$ is, however, also reduced thereby at the same time can be accepted since all that matters is increasing the maximum achievable speed $V_{max}$.

In general, in a transport apparatus 1, the drive coils 7, 8 of one transport segment TSk are controlled by a control unit 10 for example such that the transport unit Tn that interacts with the drive coils 7 of the corresponding transport segment TSk is moved along the transport segment TSm in the desired manner (position, speed, acceleration, jolting) by means of the generated propulsive force Fv. As a result for example a constant speed V of the transport unit Tn can be set irrespective of the load and the route. If, in order to reduce the magnetic flux ψ in the magnetic circuit 21, the magnetic reluctance Rm is increased and/or the magnetomotive force Um is reduced while the coil voltage on the drive coils 7 remains the same, the speed V of the transport unit Tn simultaneously also increases, however, due to the resultant lower EMF voltage $U_{EMF}$. This situation may occur for example in the case of simple feed-forward control of the drive coils 7 by means of the control unit 10.

In normal circumstances, however, feedback control is implemented in the control unit 10 in order to control the movement of the transport unit Tn. In this case, for example a target speed of the transport unit Tn is specified and is set by the control unit 10 by specifying the coil voltages of the active drive coils 7. If, in this case, the magnetic reluctance Rm is increased and/or the magnetomotive force Um is reduced in order to reduce the magnetic flux ψ in the magnetic circuit 21, the control unit 10 continues to ensure that the target speed remains set. Therefore, in this case, the control unit 10 reduced the coil voltages applied in order to counteract the increasing speed V of the transport unit Tn. In this case, however, a higher speed V of the transport unit Tn can be achieved by increasing the target speed. It is thus possible to nonetheless take advantage of the higher speed potential.

It is thus possible, in both cases, to also increase the maximum achievable speed $V_{max}$ of the transport unit Tn despite the limitation on the coil voltage in particular due to the power electronics and thermal limits. This results in a larger speed range for transport unit Tn while the power electronics units remain unchanged, making it possible to react in a more flexible manner to the desired control. The magnetic reluctance Rm of the magnetic circuit 21 and/or the magnetomotive force Um can of course also be changed in the manner according to the invention on a double-sided transport route. For this purpose, drive magnets 4, 5 are arranged on both sides of the main body 3 of the transport unit Tn, which magnets interact with drive magnets 7, 8 of the double-sided transport route in order to generate a propulsive force Fv. In this case, the drive magnets 4, 5 can be used by first actuators 9, 10, the drive coils 7, 8 can be used by second actuators 16, 17, the magnetic reluctance elements 24, 27 can be used by third and fourth actuators 23, 28 in order to change the magnetic reluctance Rm and/or the additional coil 25 can be used to change the magnetomotive force Um on the transport unit Tn, or a combination of said possibilities may be used. However, it would also be conceivable, for example, in the case of a double-sided embodiment, for the magnetic reluctance Rm of the magnetic circuit 21a or the magnetomotive force Um to be adjustable on just one side (the side of the drive magnets 4), and for the magnetic reluctance Rm of the magnetic circuit 21b or the magnetomotive force Um on the other side (the side of the drive magnets 4) to be invariable.

For example, the maximum achievable speed $V_{max}$ of the transport unit Tn can be achieved using the control method described in FIG. 6. This is again independent of the control of the movement of the transport unit Tn. In this case, for example a target magnetic flux $Ψ_{soft}$ is specified which leads to a larger air gap 20, resulting in a higher magnetic reluctance Rm and consequently a lower magnetic flux Ψ. As an alternative to changing the air gap 20, in order to change the magnetic flux Ψ it is also possible, as described, to remove a magnetic reluctance element 24 from the air gap 20 for example, or to remove a magnetic reluctance element 27 from the openings 29 of the transport route 2, in order to increase the magnetic reluctance Rm. The control can of course again be carried out using any desired combination of the described methods for changing the magnetic flux Ψ.

Figure 7A:
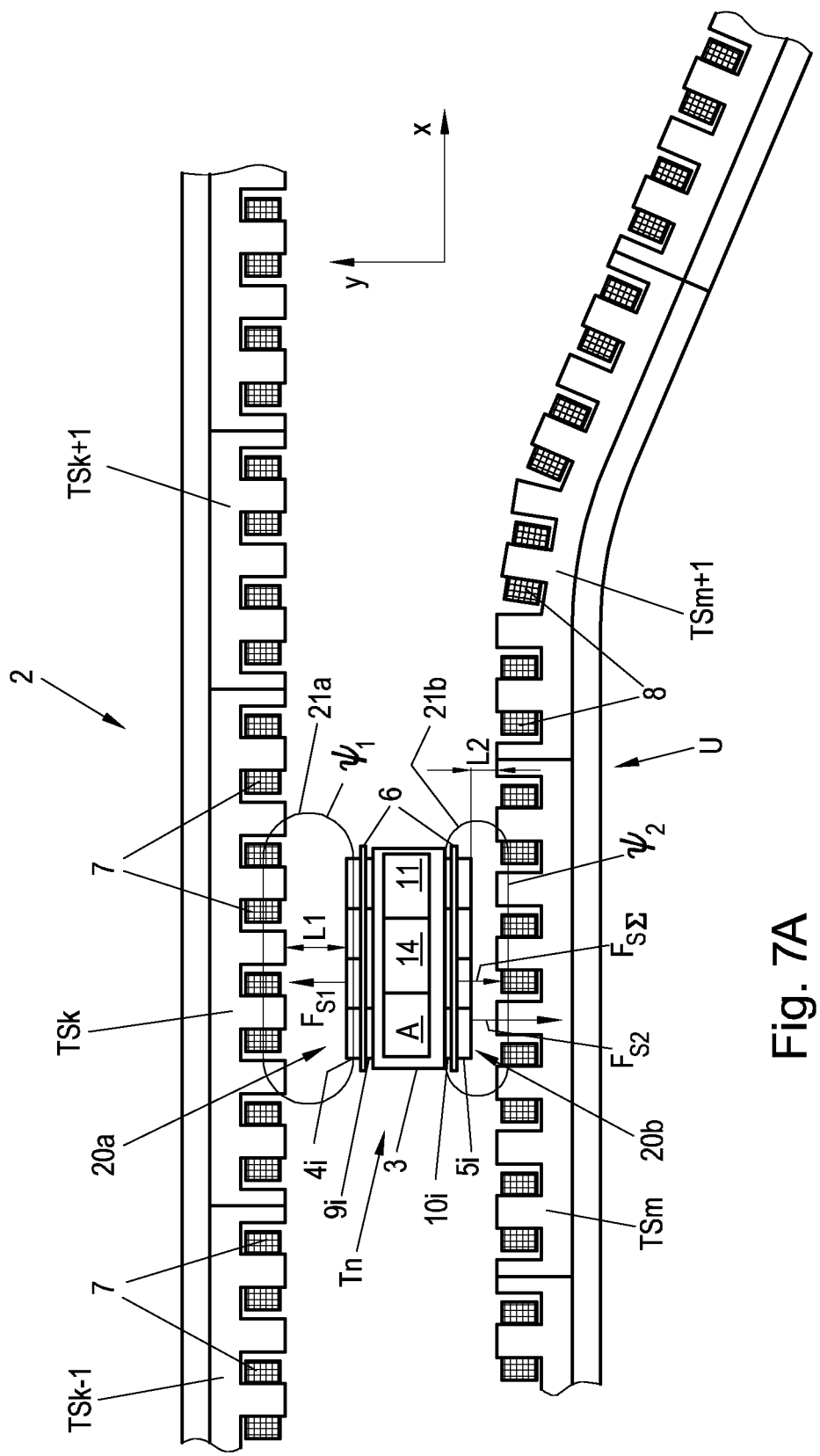
FIGS. 7A and 7B are plan views of a transport unit, in the longitudinal direction, in a transfer position of a transport route.
Figure 7B:
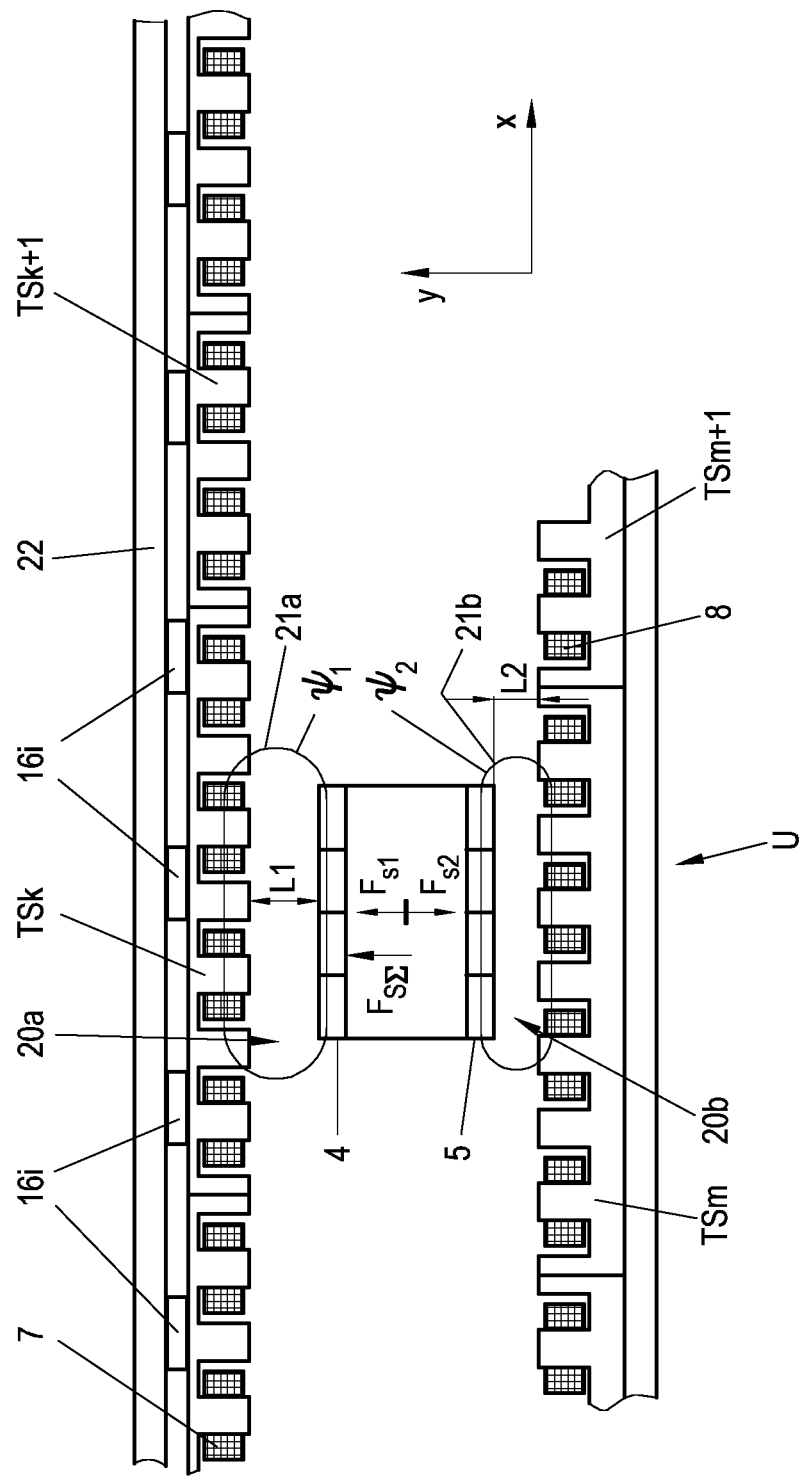

A further advantageous use of the method according to the invention for transferring a transport unit Tn at a transfer position U of a transport route 2 is set out with reference to FIG. 7A and FIG. 7B. A transfer position U of this kind is for example in the form of a track switch is shown in FIG. 1. A transfer position U could, however, of course also be formed as a straight transfer position U, as is also shown in FIG. 1 for example (e.g. in transport segments TS1, TS4), in order to transfer the single-sided guidance of the transport unit Tn along the transport segments TSk on one side to the transport segments TSm on the other side. Drive coils 7, 8 are arranged on both sides, viewed in the movement direction x, in the region of a transfer position U. In this case, the transport unit Tn is designed such that drive magnets 4$i$, 5$i$ are arranged on both sides of the main body 3, which magnets interact with the drive coils 7, 8 of the transport route 2, arranged on both sides, in order to create a propulsive force Fv in the movement direction x. However, as already described, a transport route 2 may also be designed so as to be double-sided, i.e. having drive coils 7, 8, arranged on both sides, outside a transfer position U, so as to generate a greater propulsive force Fv compared with a single-sided transport route 2, in order to overcome inclinations of the transport route 2, to transport greater loads, or for higher accelerations. In order to move a transport unit Tn forwards, preferably stator currents $i_{A1}$, $i_{A2}$ of the same magnitude are input, in a known manner, into the drive coils 7, 8 on both sides, it also being possible for different stator currents $i_{A1}$, $i_{A2}$ to be input into different drive coils 7, 8 on one side. However, in order to move the transport unit Tn it is not necessary for the drive coils 7, 8 on both sides to be energized simultaneously by a stator current $i_{A1}$, $i_{A2}$ by applying a coil voltage. It is sufficient, in principle, for the propulsive force $F_v$ that acts on the transport unit Tn in order to produce movement to be generated only by the drive coils 7, 8 of one side and the drive magnets 4$i$, 5$i$ on the associated side of the transport unit Tn.

In a known manner, lateral forces $F_{S1}$, $F_{S2}$ always act on the transport unit Tn on both sides and in the transverse direction y due to the interaction of the drive magnets 4$i$, 5$i$ of the transport unit Tn with the ferromagnetic components of the long stator of the transport route 2, e.g. with teeth 12 of a ferromagnetic core 13. In normal circumstances, the lateral forces $F_{S1}$, $F_{S2}$ acting on both sides of the transport unit Tn are of the same magnitude and oriented counter to one another when the air gaps 20$a$, 20$b$ and the design of the long stator are the same on both sides, and therefore the vectorial sum of the acting lateral forces $F_{S1}$, $F_{S2}$ that result from magnetic excitation is zero. Ideally, the transport unit Tn is therefore free of lateral forces. As has already been described in detail, the present invention is based on the magnetic flux $\Psi$ in the magnetic circuit 21 formed by the drive magnets 4$i$, 5$i$ of the transport unit Tn and the drive coils 7, 8 being deliberately influenced by changing the magnetic reluctance Rm and/or the magnetomotive force Um. Changing the magnetic flux $\Psi$ in this manner according to the invention, by changing the magnetic reluctance Rm and/or the magnetomotive force Um can, however, also be used in a transfer position U, as shown in FIGS. 7A and 7B, in order to deliberately influence the lateral forces $F_{S1}$, $F_{S2}$ so as to achieve a steering effect for the transport unit Tn. It should be noted here that, in this case, the position of the transport unit Tn in the transverse direction Y does not change, since the transport unit Tn is held as centrally as possible between the two transport segments TSk, TSm by means of a guide (not shown). The steering effect simply means, therefore, that, in the region of the transfer position U, the force ratios on the transport unit Tn change, but not the position thereof in the transverse direction Y.

Taking the example of the embodiment in FIG. 7A (corresponds in principle to the embodiment according to FIG. 2A) comprising drive magnets 4$i$, 5$i$ that are arranged on both sides of the transport unit Tn and are arranged on base plates 6 that can be moved by means of first actuators 9$i$, 10$i$, for example the air gap spacing L1 of the air gap 20$a$ on one side of the transport unit Tn, between the drive magnets 4 and drive coils 7, is increased, and/or the air gap spacing L2 of the air gap 20$b$ on the other side of the transport unit Tn, between the drive magnets 5$i$ and drive coils 8, is reduced (or vice versa, depending on the manner in which the transport unit Tn is steered to the transfer position U). It would of course also be possible to increase the air gap spacing L1 of the air gap 20$a$ on just one side and to keep the air gap spacing L2 of the air gap 20$b$ on the other side constant; all that matters here is the relative change in the air gaps 20$a$, 20$b$ with respect to one another. As has been described with reference to FIG. 2B and FIG. 2C, in an alternative embodiment of the transport unit Tn or of the adjustment of the air gap, it would of course also be possible to adjust the spacings Li and the angle $\alpha_i$ in the air gap 20, between individual drive magnets 4$i$, 5$i$ and drive coils 7, 8. The air gap spacings $L1 \neq L2$ that are now of different magnitudes result in magnetic fluxes $\Psi_1 \neq \Psi_2$ of different magnitudes in the magnetic circuits 21$a$, 21$b$ on either side, resulting in lateral forces $F_{S2} \neq F_{S1}$, caused by magnetic excitation, having different magnitudes, assuming the coil voltages and/or stator currents $i_{A1}$, $i_{A2}$ remain unchanged. As a result, the vectorial sum of the two lateral forces $F_{S2}$, $F_{S1}$ caused by magnetic excitation thus yields a resultant lateral force $F_{S\Sigma}$ in the transverse direction y in the direction of one of the two sides. If the transport unit Tn now moves further into the divergent region of the transfer position U, in the movement direction x, this resultant lateral force $F_{S\Sigma}$ causes the transport unit Tn to be moved further along the transport segment TSm+1. This makes it possible to deliberately steer the transport unit Tn in one direction, for example in the direction of the lower route portion, by deliberately changing the magnetic flux $\Psi_1$, $\Psi_2$ in the two magnetic circuits 21$a$, 21$b$, without changing the coil voltages or stator currents $i_{A1}$, $i_{A2}$ of the drive coils 7, 8. This method can of course also be applied in straight transfer positions U.

The transfer process can of course again be carried out using any other described embodiment for changing the magnetic flux $\Psi$. FIG. 7B, for example, shows a transfer position U in which (similarly to the embodiment according to FIG. 3A) second actuators 16$i$ are arranged on one side of the transport route 2, between the stationary support structure 22 and transport segments TSk, by means of which actuators the magnetic flux $\Psi_1$ of the magnetic circuit 21$a$ can be changed in that the magnetic reluctance Rm can be changed by changing the air gap spacing L1. If the air gap spacing L1 between the drive magnets 4 and the drive coils 7 of the transport segment TSk is reduced compared with the air gap spacing L2 between the drive magnets 5 and the drive coils 8 of the transport segment Tsm (L1<L2), the magnetic reluctance Rm of the magnetic circuit 21$a$ reduces compared with the magnetic reluctance Rm of the magnetic circuit 21$b$. Accordingly, the magnetic flux $\Psi_1$ in the magnetic circuit 21$a$ increases compared with the magnetic flux $\Psi_2$ in the magnetic circuit 21$b$ ($\Psi_1 > \Psi_2$), resulting in a lateral force $F_{S1}$ that is greater than the lateral force $F_{S2}$ ($F_{S1} > F_{S2}$), on account of which a resultant lateral force $F_{S\Sigma}$ consequently acts on the transport unit Tn in the direction of the upper transport segment TSk, and the transport unit Tn is thus reliably guided along the transport segment TSk. TSk+1 when further movement occurs.

Outside the region of the transfer position U the lateral forces $F_{S2}$, $F_{S1}$ caused by magnetic excitation may of course again be the same (if there is a double-sided arrangement of drive coils 7, 8), since a steering effect is no longer required.

Furthermore, the method for changing the magnetic reluctance Rm by means of magnetic reluctance elements 24, 27 could also be used for transferring the transport unit in a transfer position U, or the additional coil 25 according to the invention on the transport unit Tn could also be used for changing the magnetomotive force Um on the transport unit Tn. Any desired combination of the described possibilities for changing the magnetic flux on one or both sides is also conceivable. Since these methods have already been sufficiently described and follow the inventive concept of changing the magnetic flux ψ, they will not be separately discussed again in relation to the transfer position U.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A method for compensating for guidance inaccuracies of a transport apparatus that includes a transport unit having drive magnets arranged on both sides and being configured to move along a transport route of the long stator linear motor, the transport route including at least one double-sided track section with drive coils arranged on both sides of the transport unit, the drive magnets on each side of the transport unit being configured to interact in the double-sided track section with the drive coils of the transport route on the same side in order to generate a propulsive force (Fv), wherein the interacting drive magnets of the transport unit and drive coils of the transport route of the long stator linear motor are configured to develop magnetics circuits on both sides, at least one actuator arranged on the transport unit, the at least one actuator being configured to adjust the position of at least one drive magnet on each side of the transport unit in at least one degree of freedom of movement and/or at least one actuator arranged on the transport route, the at least one actuator being configured to adjust the position of at least one drive coil of each side in at least one degree of freedom of movement, the method comprising:
   defining for at least one side a target magnetic flux (Ψsoll) corresponding to a constant air gap; and
   controlling an actual magnetic flux (Ψist) in the developing magnetic circuit on said at least one side to the defined target magnetic flux (Ψsoll).

2. A method for operating a transport apparatus that utilizes a long stator linear motor, the method comprising:
   moving a transport unit having drive magnets arranged on both sides along a transport route of the long stator linear motor, said transport route comprising at least one double-sided track section, having drive coils arranged on both sides of the transport unit;
   causing in said double-sided track section the drive magnets of at least one side of the transport unit to interact with the drive coils of the transport route of the same side in order to generate a propulsive force (Fv), wherein said interacting drive magnets and drive coils develop a magnetic circuit on said at least one side; and
   during movement of the transport unit along the double-sided track section changing a magnetic reluctance of the developing magnetic circuit on said at least one side by changing on said side of the transport unit:
   a position of at least one of said drive magnets of the transport unit; and/or
   a position of at least one of said drive coils of the transport route in at least one degree of freedom of movement.

3. The method of claim 2, further comprising, in said double-sided track section utilizing the interacting drive magnets of the transport unit and drive coils of the transport route of the long stator linear motor as sources of magnetomotive force of the developing magnetic circuit of said at least one side and during movement of the transport unit along the double-sided track section changing the magnetomotive force on the transport unit.

4. The method of claim 3, further comprising changing the magnetomotive force on the transport unit by applying an electrical boost voltage to at least one additional coil, arranged on the transport unit, wherein the applying occurs at least intermittently in order to at least intermittently increase or reduce the magnetomotive force on the transport unit, whereby a magnetomotive boost force is generated that is oriented in a same direction as or counter to the magnetomotive force of the drive magnets such that a resulting magnetic flux is increased or reduced.

5. The method of claim 2, further comprising, during movement of the transport unit along the double-sided track section of the transport route, determining an actual magnetic flux (Ψist) in the developing magnetic circuit of the at least one side and controlling with a control unit the actual magnetic flux (Ψist) to a defined target magnetic flux (Ψsoll) by changing the magnetic reluctance (Rm) and/or by changing a magnetomotive force (Um) on the transport unit.

6. The method of claim 2, further comprising changing the magnetic reluctance of the magnetic circuit of at least one side by introducing at least one magnetic reluctance element having a specified magnetic permeability into an air gap between at least one of the drive magnets of the transport unit and at least one of the drive coils of the transport route.

7. The method of claim 2, further comprising changing the magnetic reluctance of the magnetic circuit of at least one side by introducing at least one magnetic reluctance element having a specified magnetic permeability into an opening arranged on the transport route.

8. The method claim 2, further comprising:
   defining in the developing magnetic circuit of the at least one side a target magnetic flux that corresponds to a predefined constant air gap; and
   controlling with the control unit the actual magnetic flux to the defined target magnetic flux by changing the magnetic reluctance and/or a magnetomotive force on the transport unit.

9. The method of claim 2, further comprising:
   changing in the magnetic circuit of the at least one side of the transport unit, the magnetic reluctance and/or a magnetomotive force on the transport unit in order to generate a lateral force that acts on the transport unit.

10. The method of claim 2, further comprising:
    reducing a magnetic flux of the developing magnetic circuit of the at least one side by changing the magnetic reluctance and/or a magnetomotive force on the transport unit.

11. A transport apparatus that utilizes a long stator linear motor, comprising:

a transport unit having drive magnets arranged on both sides and being configured to move along a transport route of the long stator linear motor;

the transport route comprising at least one double-sided track section with drive coils arranged on both sides of the transport unit;

the drive magnets on each side of the transport unit being configured to interact in said double-sided track section with said drive coils of the transport route on the same side in order to generate a propulsive force (Fv), wherein said interacting drive magnets of the transport unit and drive coils of the transport route of the long stator linear motor are configured to develop magnetics circuits on both sides;

at least one actuator arranged on the transport unit, said at least one actuator being configured to adjust the position of at least one drive magnet on each side of the transport unit in at least one degree of freedom of movement and/or at least one actuator arranged on the transport route, said at least one actuator being configured to adjust the position of at least one drive coil of each side in at least one degree of freedom of movement; and a control unit configured to change in the double-sided track section a magnetic reluctance of the magnetic circuit of at least one side by actuating the at least one actuator arranged on the transport unit in order to change the position of at least one of said drive magnets and/or by actuating the at least one actuator arranged on the transport route in order to change the position at least one of the drive coils.

12. The transport apparatus of claim 11, wherein the control unit is configured to control at least during movement of the transport unit along the double-sided track section of the transport route, at least in the magnetic circuit of one side an actual magnetic flux ($\Psi$ist) to a defined target magnetic flux ($\Psi$soll) by changing the magnetic reluctance (Rm) of the magnetic circuit and/or by changing a magnetomotive force (Um) of the magnetic circuit on the transport unit.

13. The transport apparatus of claim 11, further comprising at least one actuator arranged on the transport unit or on the transport route and further comprising:

at least one magnetic reluctance element having a specified magnetic permeability and being insertable by way of the at least one actuator into an air gap between at least one drive magnet of the transport unit and at least one drive coil of the transport route.

14. The transport apparatus of claim 11, further comprising at least one actuator arranged on the transport route and further comprising:

at least one magnetic reluctance element having a specified magnetic permeability being insertable by way of the at least one actuator into an opening arranged on the transport route.

15. The transport apparatus of claim 11, further comprising at least one additional coil arranged on the transport unit, said additional coil being configured to at least intermittently receive a boost voltage in order to at least during movement of the transport unit along the double-sided track section intermittently change in the developing magnetic circuit of at least one side a magnetomotive force on the transport unit.

16. A method for transferring a transport unit of a transport apparatus at a transfer position of a transport route, the transport apparatus including the transport unit having drive magnets arranged on both sides and being configured to move along the transport route of a long stator linear motor, the transport route including at least one double-sided track section with drive coils arranged on both sides of the transport unit, the drive magnets on each side of the transport unit being configured to interact in the double-sided track section with the drive coils of the transport route on the same side in order to generate a propulsive force (Fv), wherein the interacting drive magnets of the transport unit and drive coils of the transport route of the long stator linear motor are configured to develop magnetics circuits on both sides, at least one actuator arranged on the transport unit, the at least one actuator being configured to adjust the position of at least one drive magnet on each side of the transport unit in at least one degree of freedom of movement and/or at least one actuator arranged on the transport route, the at least one actuator being configured to adjust the position of at least one drive coil of each side in at least one degree of freedom of movement, the method comprising:

changing, on at least one side of the transport unit, at least the magnetic reluctance in order to generate a lateral force that acts on the transport unit.

17. A method for increasing a maximum achievable speed of a transport unit utilizing a transport apparatus the transport apparatus including the transport unit, which has drive magnets arranged on both sides and is configured to move along a transport route of a long stator linear motor, the transport route including at least one double-sided track section with drive coils arranged on both sides of the transport unit, the drive magnets on each side of the transport unit being configured to interact in the double-sided track section with the drive coils of the transport route on the same side in order to generate a propulsive force (Fv), wherein the interacting drive magnets of the transport unit and drive coils of the transport route of the long stator linear motor are configured to develop magnetics circuits on both sides, at least one actuator arranged on the transport unit, the at least one actuator being configured to adjust the position of at least one drive magnet on each side of the transport unit in at least one degree of freedom of movement and/or at least one actuator arranged on the transport route, the at least one actuator being configured to adjust the position of at least one drive coil of each side in at least one degree of freedom of movement, the method comprising:

reducing on at least one side a magnetic flux of the developing magnetic circuit by changing the magnetic reluctance.

18. A method for operating a transport apparatus that utilizes a long stator linear motor, the method comprising:

moving a transport unit having drive magnets arranged on both sides along a transport route of the long stator linear motor, the transport route comprising at least one double-sided track section with drive coils arranged on both sides of the transport unit;

in the double-sided track section causing drive magnets of at least one side of the transport unit to interact with drive coils of the transport route of the same side in order to generate a propulsive force (Fv), wherein the interacting drive magnets of the transport unit and drive coils of the transport route develop a magnetic circuit, in which the drive magnets and the drive coils are sources of magnetomotive force; and during movement of the transport unit along the double-sided track section of the transport route, changing:

a magnetic reluctance (Rm) on the at least one side by changing on said side a position of at least one of said drive magnets of the transport unit and/or a position of at least one of said drive coils of the transport route in at least one degree of freedom of movement; and/or a magnetomotive force (Um) by applying an electrical boost voltage to at least one additional coil arranged on the transport unit.

19. A transport apparatus that utilizes a long stator linear motor, comprising:
   a transport unit having drive magnets arranged on both sides and being configured to move along a transport route of the long stator linear motor;
   the transport route comprising at least one double-sided track section with drive coils arranged on both sides of the transport unit;
   the drive magnets on each side of the transport unit being configured to interact in said double-sided track section with said drive coils of the transport route on the same side in order to generate a propulsive force (Fv), wherein said interacting drive magnets of the transport unit and drive coils of the transport route of the long stator linear motor are configured to develop a magnetic circuit on each side in which the drive magnets and drive coils are sources of magnetomotive force;
   at least one of:
      an actuator arranged on the transport unit, said at least one actuator being configured to adjust the position of at least one drive magnet on each side of the transport unit in at least one degree of freedom of movement;
      at least one actuator arranged on the transport route, said at least one actuator being configured to adjust the position of at least one drive coil of each side in at least one degree of freedom of movement; or
      at least one additional coil arranged on the transport unit, and a control unit configured to change in the magnetic circuit of each side at least one of:
      a magnetic reluctance by changing a position of at least one of said drive magnets;
      at least one of the drive coils in at least one degree of freedom of movement; or
      a magnetomotive force utilizing at least one additional coil arranged on the transport unit.

\* \* \* \* \*